United States Patent
Pakzad et al.

(10) Patent No.: US 7,634,375 B1
(45) Date of Patent: Dec. 15, 2009

(54) MULTI-DRIVE ADAPTOR FOR USE IN A SLOT OF A DISK DRIVE TEST SYSTEM

(75) Inventors: Mostafa Pakzad, Palos Verdes Peninsula, CA (US); Minh H. Trinh, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 311 days.

(21) Appl. No.: 11/190,281

(22) Filed: Jul. 26, 2005

Related U.S. Application Data

(63) Continuation-in-part of application No. 10/286,146, filed on Oct. 31, 2002, now Pat. No. 7,076,391.

(51) Int. Cl.
G01D 3/00 (2006.01)
G06F 3/00 (2006.01)
G01R 31/00 (2006.01)
H01R 12/00 (2006.01)

(52) U.S. Cl. .............. 702/108; 710/5; 710/8; 710/15; 710/36; 324/500; 439/55

(58) Field of Classification Search ............ None
See application file for complete search history.

(56) References Cited

U.S. PATENT DOCUMENTS

| | | | |
|---|---|---|---|
| 4,348,761 A | 9/1982 | Berger | |
| 4,888,549 A | 12/1989 | Wilson et al. | |
| 6,144,553 A | 11/2000 | Hileman et al. | |
| 6,169,413 B1 * | 1/2001 | Paek et al. | 324/760 |
| 6,434,498 B1 | 8/2002 | Ulrich et al. | |
| 6,473,301 B1 | 10/2002 | Levy et al. | |
| 6,505,281 B1 | 1/2003 | Sherry | |
| 6,826,646 B1 | 11/2004 | Muncaster et al. | |
| 6,865,514 B1 | 3/2005 | Goguen et al. | |
| 7,076,391 B1 | 7/2006 | Pakzad et al. | |
| 7,164,579 B2 * | 1/2007 | Muncaster et al. | 361/685 |
| 7,312,999 B1 * | 12/2007 | Miyamura et al. | 361/724 |
| 2004/0088482 A1 * | 5/2004 | Tanzer et al. | 711/114 |
| 2005/0018397 A1 | 1/2005 | Kay et al. | |
| 2005/0027900 A1 * | 2/2005 | Pettey | 710/22 |
| 2005/0219809 A1 * | 10/2005 | Muncaster et al. | 361/685 |

OTHER PUBLICATIONS www.webopedia.com, RAID, Jul. 28, 2004, http://web.archive.org/web/20050102044922/http://www.webopedia.com/TERM/R/RAID.html.*

(Continued)

*Primary Examiner*—Alan Chen
(74) *Attorney, Agent, or Firm*—Blakely, Sokoloff, Taylor & Zafman

(57) ABSTRACT

Disclosed is a multi-drive adaptor that includes at least two disk drive ports, a connector, and a communication path. The connector is configured to receive at least one disk drive command transmitted according to a serial protocol from a serial controller. The communication path connects the at least two disk drive ports to the connector and is configured to communicate the at least one disk drive command received at the connector to each of the at least two ports. In some embodiments the connector includes a parallel connector, and the communication path includes serial-to-parallel bridges, each serial-to-parallel bridge coupled to the parallel connector and further coupled to a respective one of the at least two ports. In some embodiments the serial controller is a SATA controller. In some embodiments the connector is a parallel ATA (PATA) connector. In some embodiments the communication path includes a port multiplier.

22 Claims, 18 Drawing Sheets

OTHER PUBLICATIONS www.webopedia.com, disk mirroring, Dec. 6, 2001, http://web.archive.org/web/20050207044806/http://www.webopedia.com/TERM/D/disk_mirroring.html.* www.webopedia.com, SAS, Sep. 7, 2004, http://web.archive.org/web/20050207202332/http://webopedia.com/TERM/S/SAS.html.*

Zunzanyika et al., "Simultaneous Development & Qualification In the Fast-Changing 3.5" Hard-Disk-Drive Technology, 1995, IEEE Publication, pp. 27-32.

Automated Production Test Solutions; Xyratex Brochure downloaded from Xyratex Web Site Oct. 28, 2002, 6 pages.

* cited by examiner

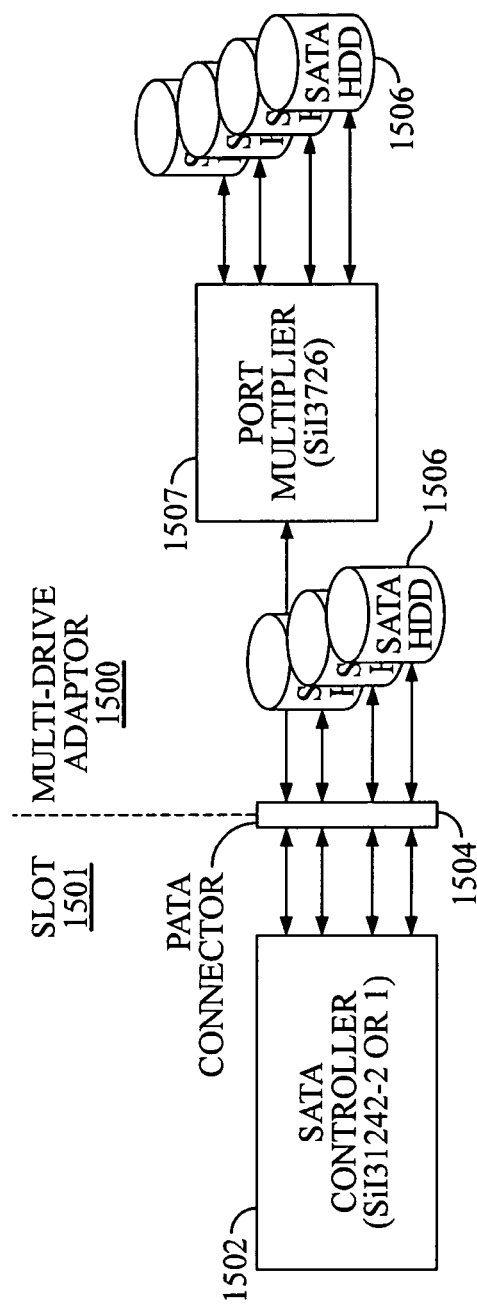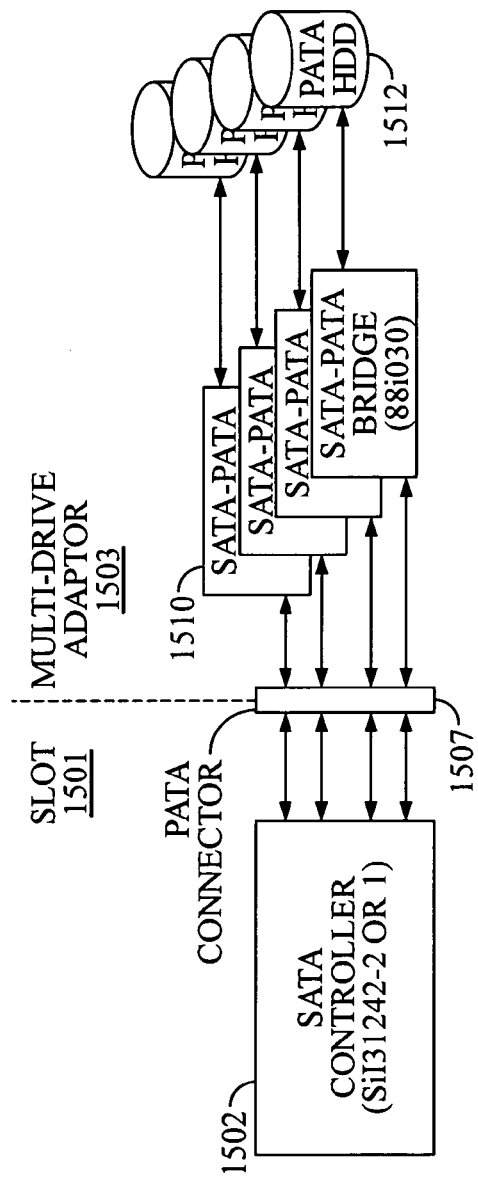
FIG. 15A
FIG. 15B

MULTI-DRIVE ADAPTOR FOR USE IN A SLOT OF A DISK DRIVE TEST SYSTEM

CROSS-REFERENCE TO RELATED APPLICATIONS

This application is a continuation-in-part of U.S. Ser. No. 10/286,146 filed on Oct. 31, 2002, and assigned to Western Digital Technologies, Inc.

BACKGROUND

1. Field of the Invention

The present invention relates to a multi-drive adaptor for use in a slot of a disk drive test system. More particularly, the invention relates to a multi-drive adaptor having at least two ports for the receipt of at least two disk drives, respectively, such that a series of tests in a serial protocol may be performed on each of the disk drives within one slot of the disk drive test system.

2. Description of the Prior Art and Related Information

FIG. 1 shows the principal components of a magnetic disk drive 100 such as may be tested by a disk drive testing system. With reference to FIG. 1, the disk drive 100 comprises a head disk assembly (HDA) 144 and a printed circuit board assembly (PCBA) 114. The HDA 144 includes a disk drive enclosure comprising base 116 and a cover 117 attached to the base 116 that collectively house a disk stack 123 that includes one or a plurality of magnetic disks (of which only a first disk 111 and a second disk 112 are shown), a spindle motor 113 attached to the base 116 for rotating the disk stack 123, an HSA 120, and a pivot bearing cartridge 184 that rotatably supports the head stack assembly (HSA) 120 on the base 116. The spindle motor 113 rotates the disk stack 123 at a constant angular velocity.

The HSA 120 comprises a swing-type or rotary actuator assembly 130, at least one head gimbal assembly (HGA) 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 that, in turn, supports the slider(s). The flex cable assembly 180 may include a flex circuit cable and a flex clamp 159. The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 111, 112 and/or by including additional disks in the disk stack 123 and by an HSA 120 having a vertical stack of HGAs 110 supported by multiple actuator arms 160.

The "rotary" or "swing-type" actuator assembly comprises a body portion 140 that rotates on the pivot bearing 184 cartridge between limited positions, a coil portion 150 that extends from one side of the body portion 140 to interact with one or more permanent magnets 192 mounted to back irons 170, 172 to form the voice coil motor (VCM), and the actuator arm 160 that supports the HGA 110. The VCM causes the HSA 120 to pivot about the actuator pivot axis 182 to cause the slider and the read write transducers thereof to sweep radially over the disk(s) 111, 112.

After the HDA 144 and the PCBA 114 are mated, the disk drive undergoes a variety of tests and procedures to configure and validate the proper operation of the disk drive. Such testing conventionally is carried out in a "single plug tester", which is a test platform that includes a bank of slots into which the disk drives are manually loaded and unloaded. Each disk drive is loaded into a corresponding slot in one-to-one correspondence. A sequential series of tests and procedures are then carried out on the loaded disk drives. Some of the test and procedures are subject to strict environmental control requirements. Conventionally, the drives remain in the same slot during the administration of the entire sequence of tests, and are removed in batch only at the conclusion of the sequence of tests.

It may be appreciated, however, that such a test platform architecture may lead to inefficiencies. Some of these inefficiencies are organic to the structure of the test platform and to its batch mode of operation, while other inefficiencies stem from various evolutionary changes in the disk drives themselves. At the outset, the batch mode of operation of single plug testers limit the platform's throughput to the time required for the slowest drive to complete the prescribed sequential series of tests. Drives that may complete the sequential series faster than other (for whatever reason) or fail any test must sit idle and occupy a slot that would otherwise be available for the administration of tests to another disk drive.

Some evolutionary changes of the disk drives themselves affect the operation of conventional test platforms such as the ongoing transition from drives having a parallel interface (e.g., parallel ATA (PATA) drives, EIDE drives, etc.) to drives having a serial interface (such as Serial Advanced Technology Architecture or SATA). However, even during this transition to serial drives, there remains a non-negligible demand for drives having a parallel interface. Therefore, from a manufacturing point of view, both parallel and serial drives must continue to be manufactured, at least during this period of transition. Moreover, the capacities of such drives can vary over a wide range. For example, if drives are based upon an 80 Gbyte platter, then 80 Gbyte drives, 160 Gbyte and 240 Gbyte drives may be produced, possibly along with other capacities.

To complicate matters, the time required for defect mapping and administration (which operations are carried out in the test platform) is directly proportional to the density of the drive, rendering the batch operation of conventional testers problematic if drives of different capacities are to be processed simultaneously. It is apparent, therefore, that disk drive manufacturers are faced with manufacturing a wide variety of disk drives of different capacities and interfaces. The testing and validation of such a wide variety of drives using conventional single plug testers is burdensome and costly.

Further, with the evolutionary change towards smaller disk drives having decreasing disk drive form factors (e.g. 2.5", 1.8", 1", etc.) a conventional slot of a conventional disk drive test system designed for a 3.5" disk drive includes a great deal of wasted space that is not needed by these newer smaller form factor disk drives.

From the foregoing, it may be appreciated that new test systems and methods are needed. In particular, what are needed are methods and systems for testing a plurality of drives that do not suffer from the inefficiencies of conventional test platforms. As drive testers represent large capital expenditures for disk drive manufacturers, a more efficient tester increases throughput, lowers costs and may allow manufacturers to use a reduced-footprint test platform, which further saves costly factory floor space.

SUMMARY

Embodiments of the invention relate to a multi-drive adaptor for use in a slot of a disk drive test system. More particularly, embodiments of the invention relate to a multi-drive adaptor having at least two ports for the receipt of at least two disk drives, respectively, such that a series of tests in a serial protocol may be performed on each of the disk drives within one slot of the disk drive test system.

In one aspect, the invention may be regarded a multi-drive adaptor that includes at least two disk drive ports, a connector, and a communication path. The connector is configured to receive at least one disk drive command transmitted according to a serial protocol from a serial controller. The communication path connects the at least two disk drive ports to the connector and is configured to communicate the at least one disk drive command received at the connector to each of the at least two ports.

In another aspect, the invention may be regarded as a method of testing disk drives in a slot of a test platform utilizing a multi-drive adaptor. The method includes: loading a first disk drive into a first disk drive port of the multi-drive adaptor, loading a second disk drive into a second disk drive port of the multi-drive adaptor, receiving a series of drive commands in a serial protocol at the multi-drive adaptor, and communicating the series of drive commands to the first and second disk drives loaded in the multi-drive adaptor.

In a further aspect, the invention may be regarded as a disk drive test system for testing a plurality of disk drives. The disk drive test system includes a test platform having a plurality of slots and a multi-drive adaptor mountable in at least one slot of the plurality of slots, in which a serial controller is assigned to the slot to communicate a series of tests in a serial protocol to the slot. The multi-drive adaptor includes at least two ports such that at least two disk drives are each mountable in each one of the at least two ports, respectively, and a printed circuit board (PCB) having a connector. The two ports are fixed to the PCB and the connector couples the at least two disk drives to the serial controller. In this way, the serial controller may communicate a series of tests in a serial protocol to be performed on each of the two disk drives.

The foregoing and other features of the invention are described in detail below and are set forth in the appended claims.

BRIEF DESCRIPTION OF THE DRAWINGS

FIG. 15A is a block diagram illustrating an example a multi-drive adaptor for use in a slot of a disk drive test system, according to an embodiment of the present invention.

FIG. 15B is a block diagram illustrating another example of a multi-drive adaptor for use in a slot of a disk drive test system, according to an embodiment of the present invention.

DETAILED DESCRIPTION

Figure 1:
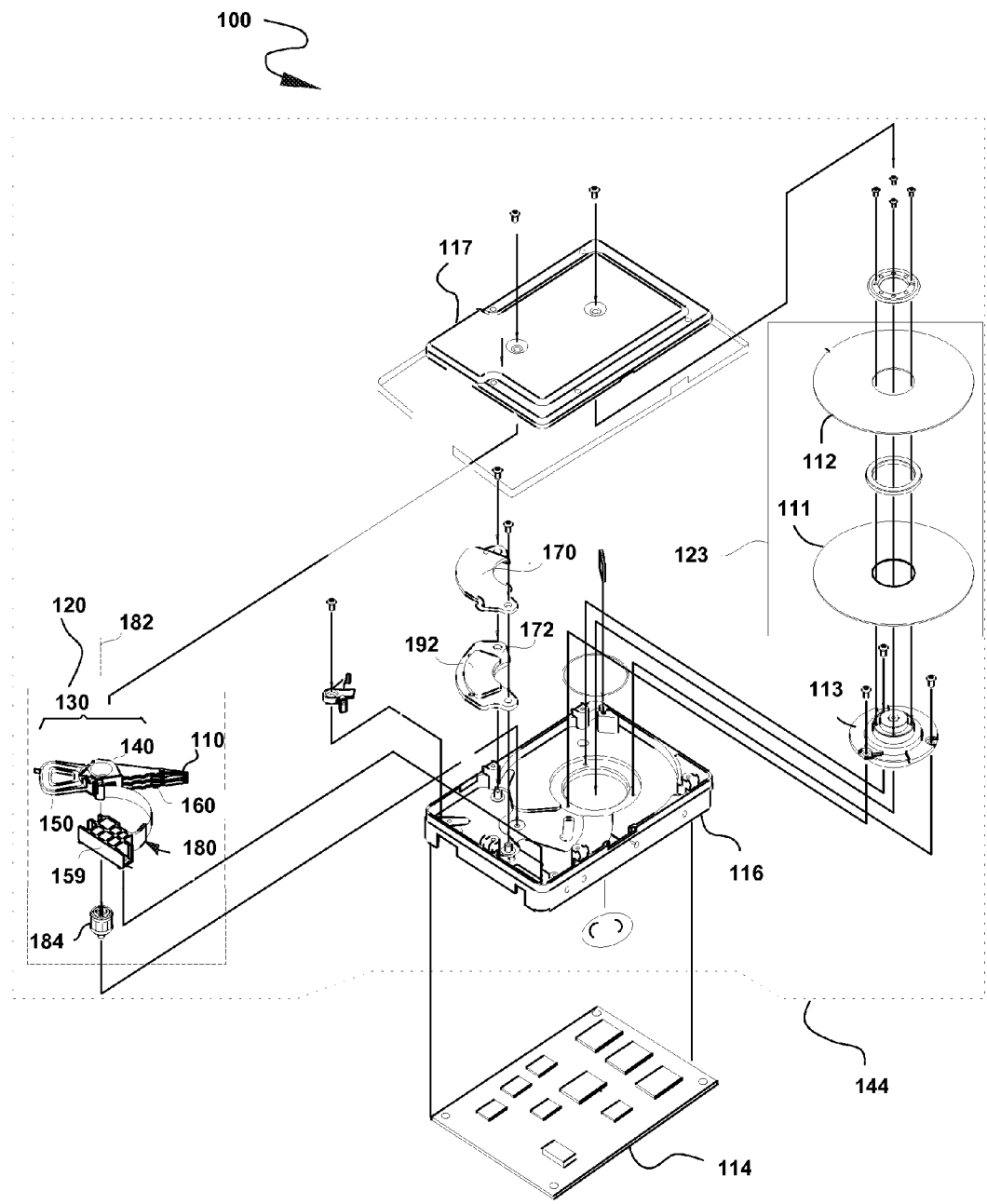
FIG. 1 is a diagram of the major components of a disk drive.
Figure 2A:
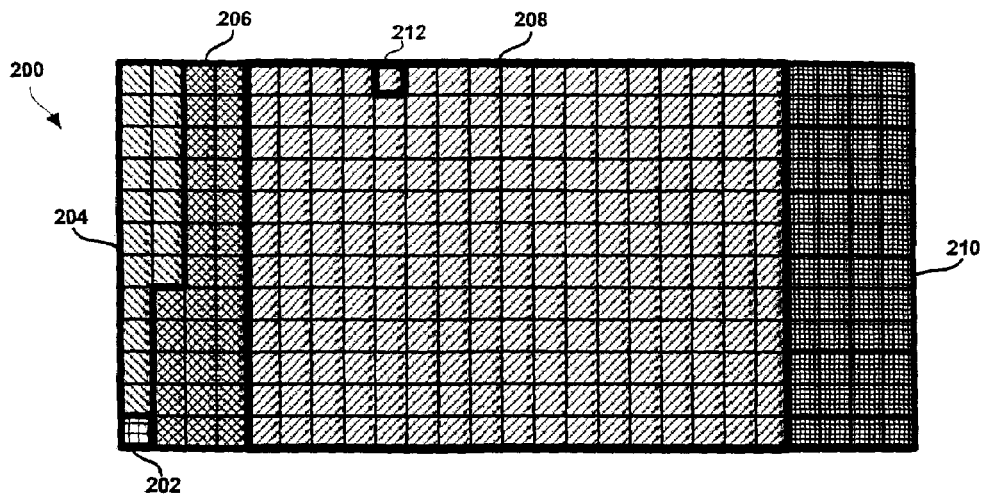
FIGS. 2A and 2B are functional diagrams of a test wall for carrying out a sequential series of test or procedures on disk drives, illustrating aspects of an embodiment of the present invention.
Figure 2B:
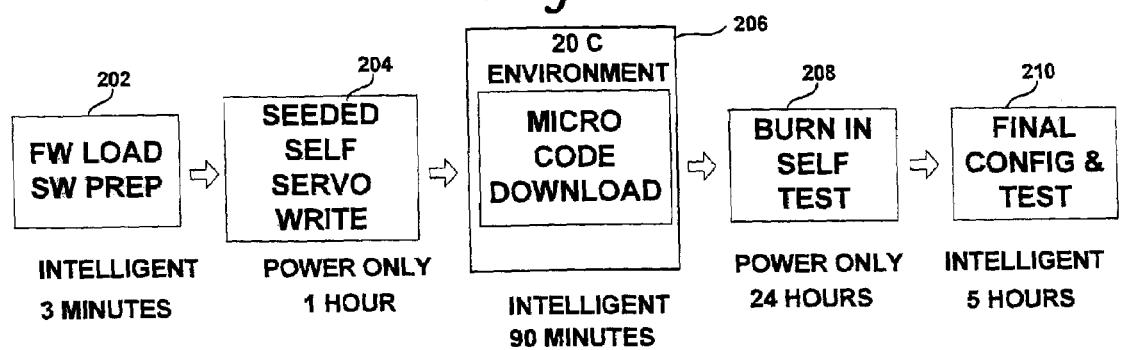

FIGS. 2A and 2B are functional diagrams of a test wall 200 for carrying out a sequential series of test or procedures on disk drives. As shown, the test wall 200 includes a plurality of slots, such as slot 212, into which the drives under test may be loaded and unloaded to administer a sequential series of tests or procedures on the drives. Each slot is configured to receive a disk drive under test (such as shown at 100 in FIG. 1) and provide communication between the drive under test and a host, such as a module controller discussed below. The plurality of slots 212 of the test wall 200 is segregated into a plurality of groups. Each group of slots 212 may be configured to satisfy predetermined environmental (such as, for example, temperature, humidity, etc.), communication bandwidth and test schedule requirements of the drives under test to be loaded therein. As shown, the number of slots 212 in each of the groups may be roughly proportional to the time required the tests or procedures to be carried out on the drives loaded in the slots of the group. In FIG. 2B is an exemplary series of sequential tests detailing the tests and procedures to be sequentially carried out by the test systems and methods of the present invention. For example, the groups of slots 212 may include a first group 202 of slots 212 dedicated to loading necessary firmware and software into the drives loaded therein. The approximate time required to carry out the tests and/or procedures on the drives under test are noted under each group, it being understood that these times are included herein for exemplary purposes only. As shown, the software and firmware loading in group 202 takes a comparatively short period of time, on the order of about three minutes. Also noted under each of the groups is the legend "Intelligent" or "Power Only", depending on whether the drives under test require communication with a host. Groups labeled "Intelligent" require that the drives under test loaded in the group communicate with a host, such as a module controller (discussed below), whereas groups labeled "Power Only" do not require communication with a host and require power only to complete the tests and/or procedures to be carried out within the group.

The next group 204 of slots 212 in the exemplary test schedule shown in FIG. 2B supports a seeded self-servo write procedure, in which servo information is written to the disk or disks of the drive under test loaded therein. During this procedure, servo sector information is being written to the drive without using a servo track writer. As servo track writing is a time consuming process that is directly proportional to the aerial density of the disk, reducing the number of servo sectors the servo track writer lays down on the disk saves manufacturing time and costs. By reducing the number of servo sectors written by the servo track writer to, for example, every other servo sector and allowing the seeded self-servo write procedure carried out in the group 204 to interpolate between the written servo sectors, significant saving in both the time and costs are achieved. In such a process, the servo track writer writes a number of reference tracks and the seeded self-servo write procedure essentially performs an inbetweening process to write servo tracks between the reference tracks written by the servo track writer. Group 204 does not require communication with a host, as the software necessary to perform the seeded self-servo write has been previously downloaded to the drive while the drive was loaded into one of the slots 212 of group 202.

The next group 206 of slots 212 supports the microcode download, which is preferably carried out in an environmentally controlled environment, such as 20° C. As the microcode is downloaded from a host, communications between the drive under test loaded into the slots 212 of the group 206 and the host (a module controller) are necessary, hence the label "Intelligent" for group 206. The group having the largest number of slots 212 is the group 208 in which the tests that take the longest time to complete are administered. Group 208 supports the initial burn in self-test (IBI self test), in which a lengthy calibration of the drive is performed, as well as procedures to discover, map and manage the defects on the media. The length of time necessary to complete this test is roughly proportional to the storage capacity of the drive under test.

The next and final group 210 of slots may be dedicated to administering final configurations and tests. This group 210 requires communication with a host computer, so as to verify the proper operation of host commands and analyzing and validating the results of the IBI self-test carried out in the group 208. Desired performance characteristics of the drive, such as head seek time, for example, may be verified within this group 210 of slots 212, if desired. It is understood that other tests and procedures may be carried out on the drives under test, in addition or in place of the tests discussed above, such as a debug process when a fault is found during testing. Such debug tests may be performed to isolate the fault, so as to facilitate the correction thereof.

Figure 3:
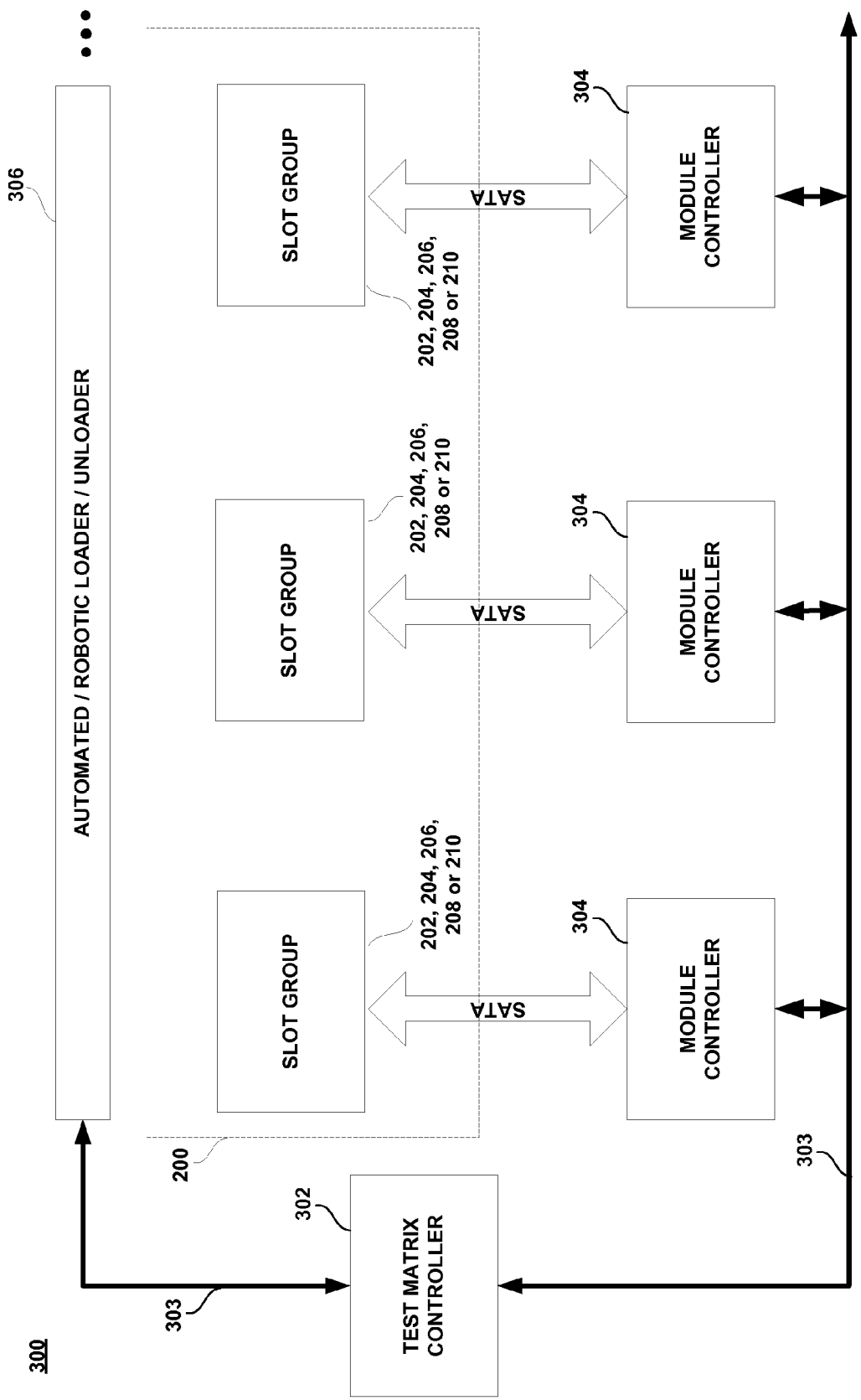
FIG. 3 is a functional diagram of an asynchronous disk drive system for testing a plurality of disk drives, according to an embodiment of the present invention.

FIG. 3 is a functional diagram of an asynchronous disk drive system 300 for testing a plurality of disk drives, according to an embodiment of the present invention. The system 300 includes a test platform 200 that includes a plurality of slots 212, each slot 212 being configured to receive and to provide communication with a disk drive under test. As detailed above, the plurality of slots is segregated into a plurality of groups 202, 204, 206, 208 or 210 and each such group is configured to satisfy predetermined environmental, communication bandwidth and test schedule requirements of the disk drives to be loaded therein. In particular, each of the slots 212 may be self-contained with respect to environmental, communication bandwidth and test schedule requirements, thereby enabling any of the disk drives loaded into or unloaded from any of the slots 212 without affecting any of the other drives loaded in any of the other slots 212 and without affecting the testing or procedures carried out on the drives. Also shown is an automated loader/unloader 306 that is configured to selectively load disk drives into and out of the test platform 200 and to move disk drives between slots of the plurality of groups. According to one embodiment of the present invention, the automated loader/unloader is robotic, and is coupled to and controlled by a computer, shown in FIG. 3 as the test matrix controller 302. The test matrix controller 302, according to the present invention, is aware of the current status of each drive under test within the system 200 through the module controllers 304. The test matrix controller 302 also issues the commands that cause the automated loader/unloader to move the drives into and out of the system 200, as well as between groups thereof. The matrix controller 302 may be coupled to the automated loader/unloader and to the module controllers 304 via an Ethernet connection 303, for example. One or more module controller computers 304 are assigned to each group 202, 204, 206, 208 or 210 of slots 212. Each group 202, 204, 206, 208 or 210 has at least one module controller 304 assigned thereto and connected to its constituent slots 212. Each module controller 304 is configured, according to the present invention, to act as an I/O controller for the drives to which it is connected and to administer at least one of the sequential tests to the disk drives loaded in the slots 212 of its assigned group, all the while insuring that the predetermined environmental, communication bandwidth and test schedule requirements of its assigned group remain satisfied. The test matrix controller 302 is coupled to and communicates with each module controller 304 and is also coupled to and controls the automated loader/unloader 306 as it moves disk drives under test into the test platform 200, out of the test platform and between groups 202, 204, 206, 208 or 210.

The movement of each disk drive into, out of and between groups 202, 204, 206, 208 or 210 of the test platform 200 is carried out asynchronously by the automated loader/unloader 306. That is, the present invention does not wait for all disk drives under test loaded into the slots 212 of a given group to have finished the administered test and does not move the disk drives in batch mode out of the test platform or to slots of another group. Instead, as individual disk drives fail any test or procedure, pass a test or complete a procedure or complete the entire series of sequential tests, they are moved asynchronously, as and when needed. This leads to great efficiencies in the full usage of the slots 212 of the test platform, as drives are moved in and out of the test platform and within the test platform as needed, and are not limited by the slowest drive finishing the administered test or the entire test sequence. According to an embodiment of the present invention, the module controllers 304 communicates with the drives under test loaded into the slots 212 according to the serial Advanced Technology Architecture (ATA) point-to-point protocol. SATA is a widely used acronym for the serial ATA protocol. Current implementations of the SATA protocol call for data rates at 1.5 Gbits/sec or multiples thereof. Both the test matrix controller 302 and the module controllers 304 may be or include personal computers (PCs) running, for example, a Linux operating system or a Microsoft operating system, such as Windows 2000 Professional for example.

Figure 4:
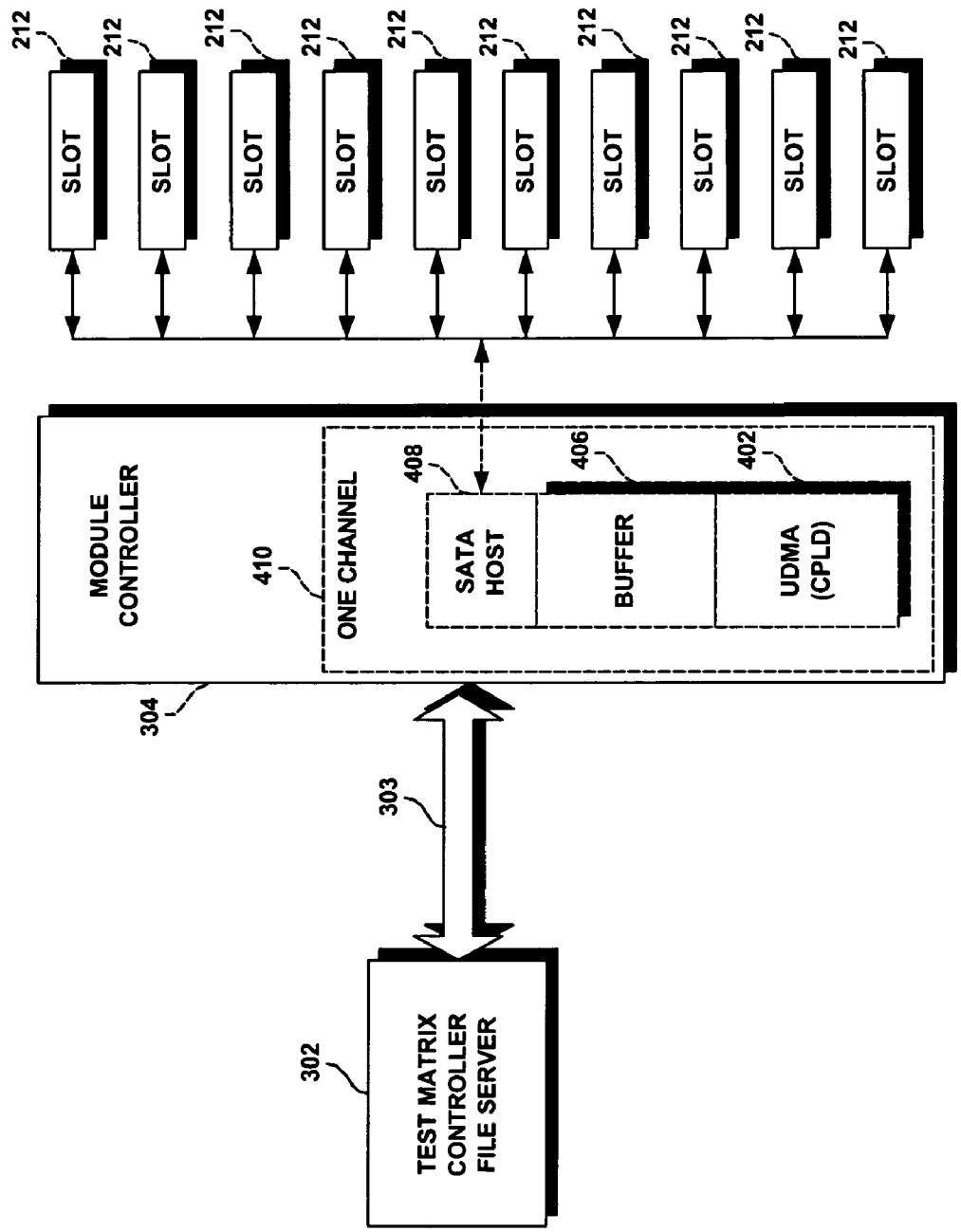
FIG. 4 shows further aspects of a module controller according to an embodiment of the present invention, and its relationship to the test matrix controller and slots of the test wall.

FIG. 4 shows further aspects of a module controller 304 according to an embodiment of the present invention, and its relationship to the test matrix controller 302 and slots 212 of the test wall 200. One communication channel 410 of a module controller 304 is shown coupled to a plurality of slots 212. According to an embodiment of the present invention, each channel 410 may include an Ultra Direct Memory Access (Ultra DMA or UDMA) module 402, which may be a complex programmable logic device, or CPLD. The UDMA module 402 is a parallel interface that typically uses a 40-pin cable. Coupled to the UDMA module 402 is a memory buffer 406 for storage of commands and data to be sent to the drive under test and a SATA host interface 408 for translating the parallel data from the UDMA module 402 into serial form conforming to the SATA protocol. The SATA host 408 is coupled to a plurality of slots 212, in a manner to be described in greater detail below.

Figure 5:
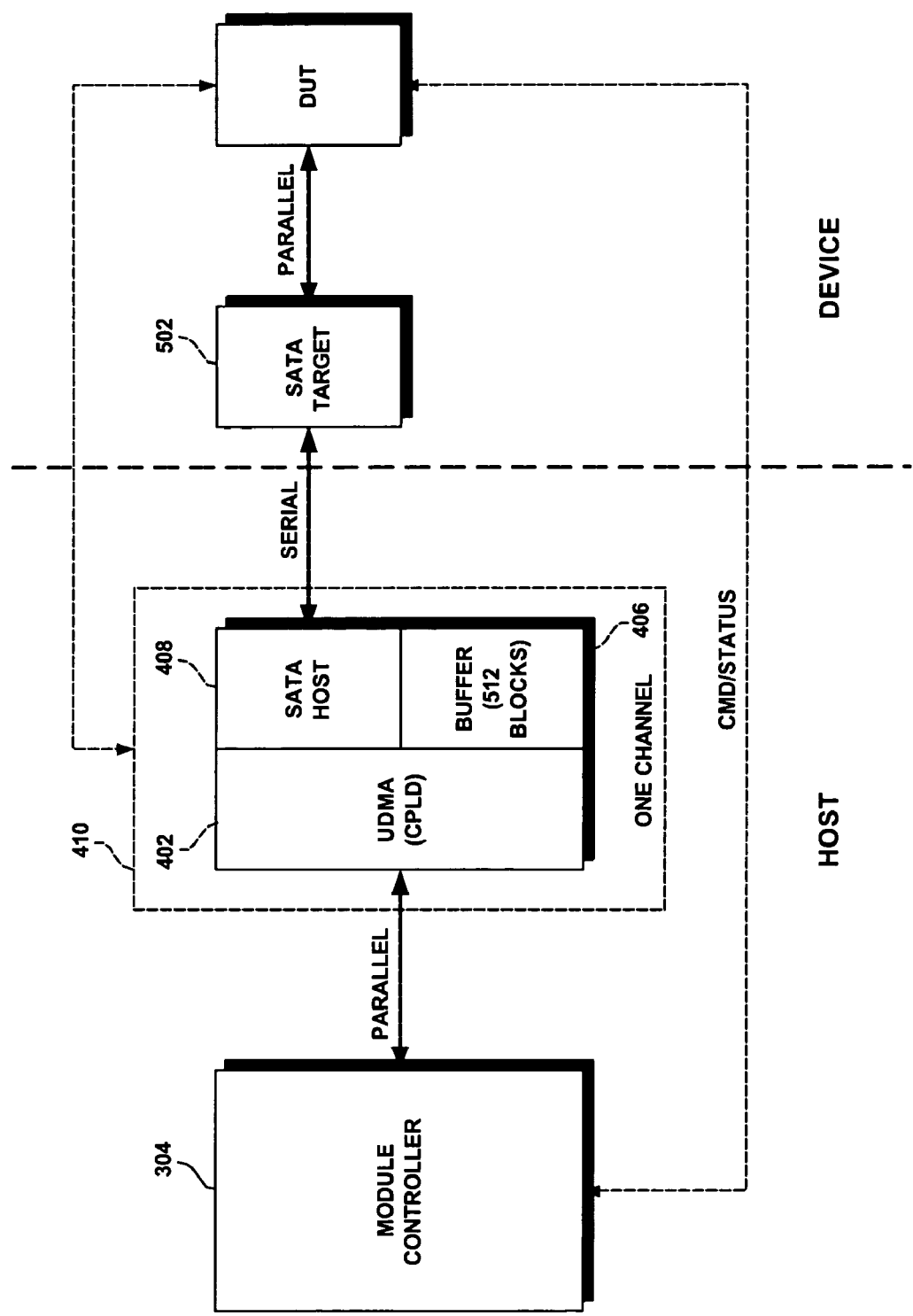
FIG. 5 illustrates further aspects of a communication channel between a module controller and a device under test, according to an embodiment of the present invention.

FIG. 5 illustrates further aspects of a communication channel between a module controller 304 and a device under test, according to an embodiment of the present invention. As shown, the communication between the module controller 304 and the channel 410 may be via a parallel connection and the communication out to the device under test may be carried out serially, via a SATA (at least 1.5 Gbits/sec). In the case wherein the drive under test has a parallel interface (EIDE or Parallel ATA), a bridge chip 502 may be interposed between the channel 410 and the device under test, to convert be serial SATA data into parallel form. To limit parasitic capacitances (among other reasons), the length of the connection between the channel 410 and the bridge chip should be 1.5 meters or less. The communication between the bridge chip 502 and the drive under test may be carried out according to the UDMA 100 (100 MHz) protocol, for example. The bridge chip 502, of course, is not necessary if the drive under test has a SATA interface. Alternatively, a switch may be present to route the incoming SATA data directly to a SATA disk drive or through the bridge chip 502 for conversion into parallel data for an EIDE drive under test. The UDMA engine 402 may communicate with an internal bus of the module controller 304 through one or more internal buses (32 bit buses, for example) for the transfer of addresses, commands and data.

Figure 6:
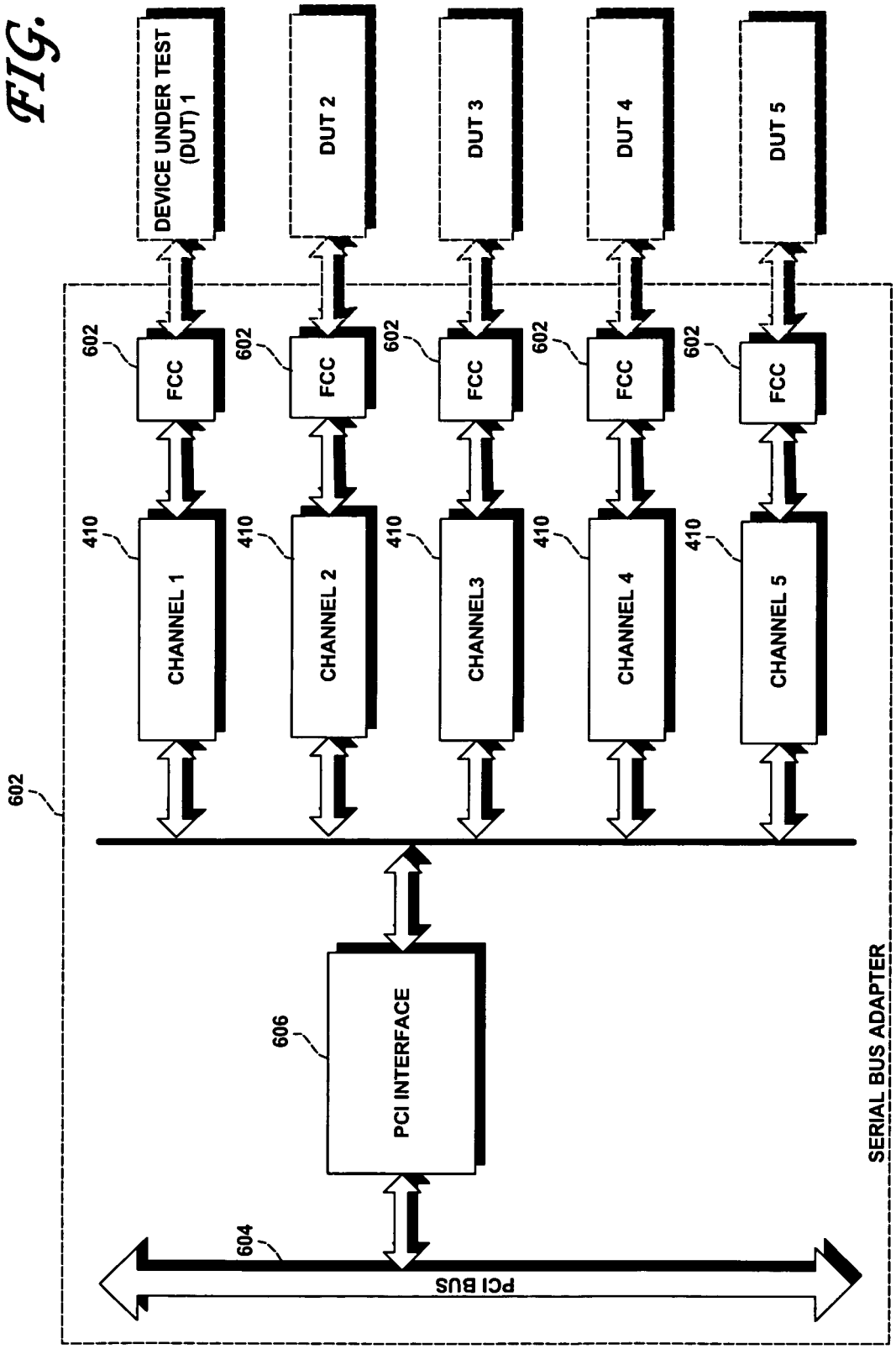
FIG. 6 shows aspects of the communication path between a module controller and the devices under tests, according to an embodiment of the present invention.

FIG. 6 shows further aspects of the communication path between the module controller 304 and the devices under test, according to an embodiment of the present invention. The module controller 304 may include one or more serial bus adaptors (SBA), as shown in FIG. 6 at 602. Each SBA 602 may include a PCI bus 604 and a PCI interface, as shown at 606. The PCI interface (which may be embodied in a CPLD, for example), may be connected to an internal bus to which a number of channels 410 are coupled. According to an embodiment of the present invention, five channels 410 may be coupled to the PCI interface 606. Each of the channels 410 may have the structure shown in FIG. 5. In turn, each channel may be coupled, via a SATA interface, for example, to a Feature Connection Card (FCC) 602, which may include the serial/parallel switch referred to relative to FIG. 5 as well as the bridge chip 502 that converts between the SATA and EIDE formats.

Figure 7:
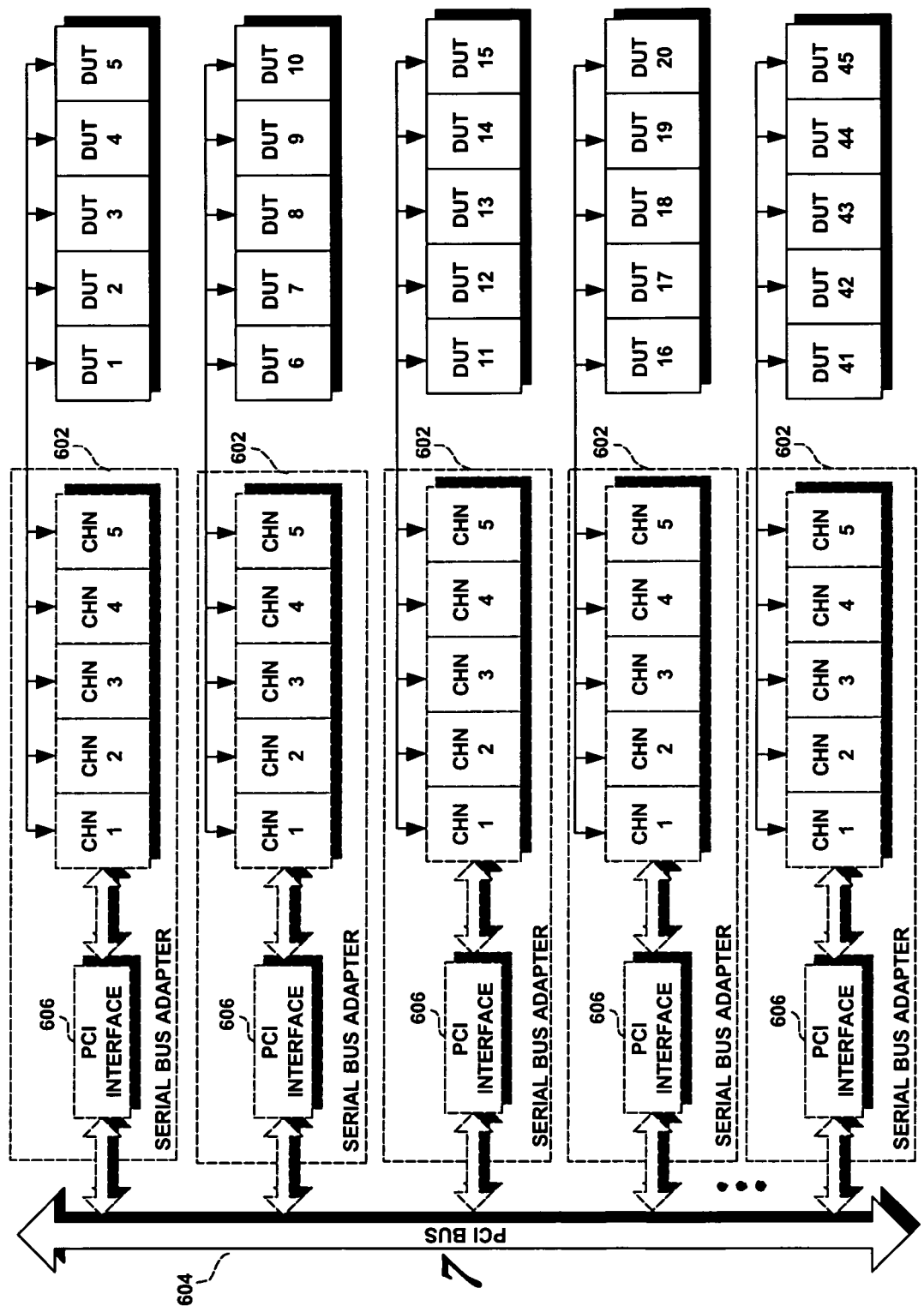
FIG. 7 shows further aspects of the communication path between the module controller and the devices under test, according to an embodiment of the present invention.

FIG. 7 shows further aspects of the couplings between the module controllers 304 and the devices under test, according to an embodiment of the present invention. As shown, according to one embodiment of the present invention, each module controller 304 may include a PCI (for example) bus with nine (for example) slots, and each slot may be configured to accommodate a SBA, such as shown in FIG. 6 at 602. In turn, each SBA 602 may be coupled to five channels such as shown at 410 in FIG. 5. The number of SBAs 602 and the number of channels per SBA 602 may be limited by board space, PCI bus loading, bandwidth requirements and the like. Note that neither the bridge chip 502 not the FCC switch described above is shown in FIG. 7, for clarity of illustration purposes only. Moreover, FIG. 7 shows that 45 channels (and 45 devices under test) may be coupled to each module controller 304. However, 45 channels is but one possible design choice and the present invention may be practiced using a greater or lesser number of SBAs 602, a greater or lesser number of channels 410 per SBA 602 and/or a greater number of devices under test coupled to each channel 410 than shown and described herein without departing from the spirit and scope of the present invention.

Figure 8:
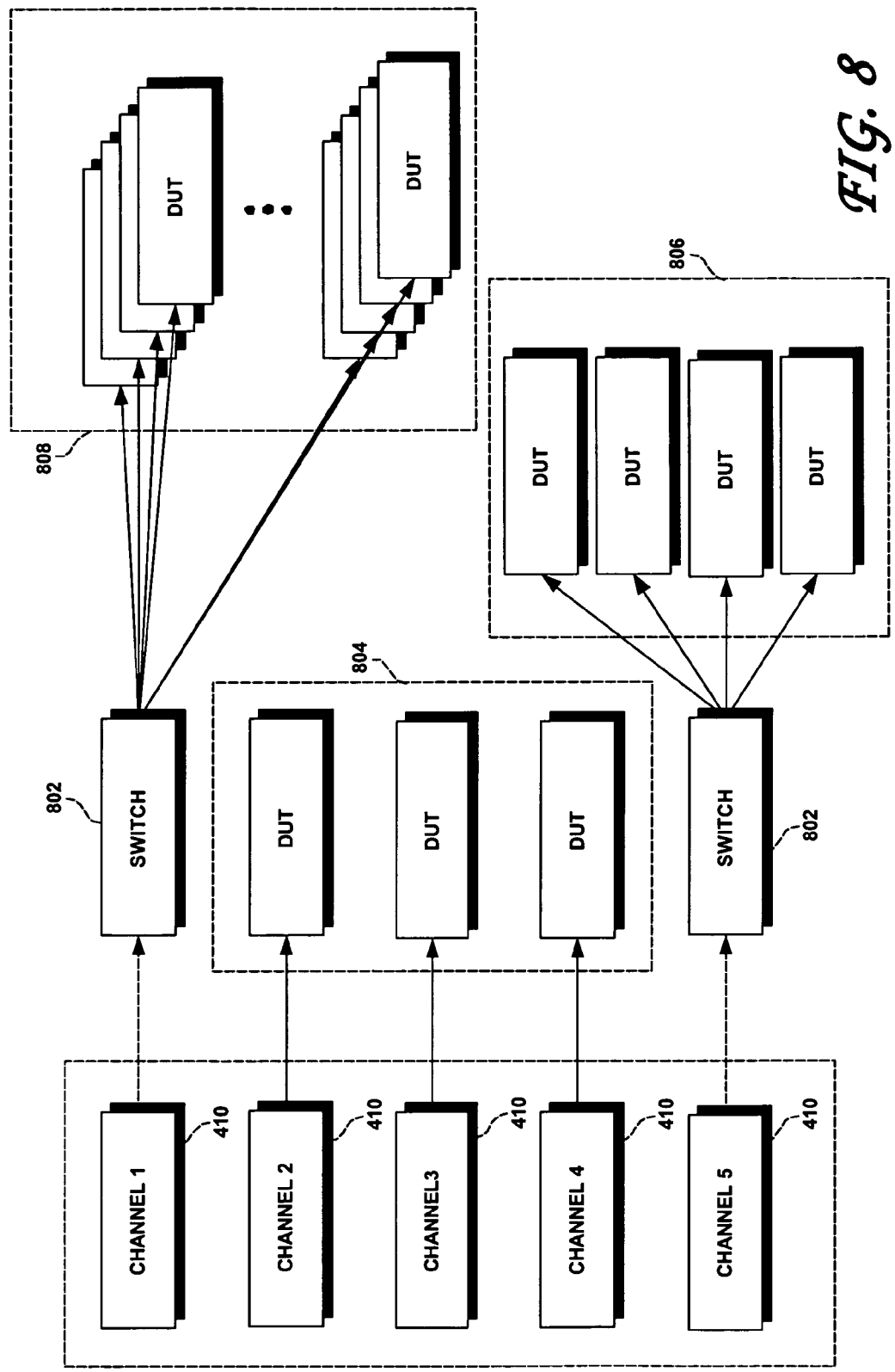
FIG. 8 shows further aspects of the couplings between the module controllers and the devices under test, according to an embodiment of the present invention.

As alluded to above, each channel 410 may be coupled to one or more devices or drives under test. Specifically, for groups of slots 212 in which data-intensive tests or procedures are carried out that require most, substantially all or all of the available channel bandwidth, only one drive under test (and thus only one slot 212) is coupled to each channel 410, as shown in FIG. 8. For such tests or procedures, therefore, there is preferably a 1:1 relationship between the channel 410 and the drive under test, as shown at 804. Slots 212 that are assigned to a group carrying out the final configuration tests (see, for example, reference numeral 210 in FIG. 2B) may each be coupled to a single channel 410. However, some tests and procedures do not consume all or even substantially all of the available channel bandwidth. For example, the tests sometimes collectively referred to as the initial drive test (IDT) is such a test. The IDT may include a power-on test, followed by a check of the basic performance of the seeking, reading and writing functions of the drive. The IDT may be referred to as having only medium data transfer requirements. Therefore, more than one slot 212 (and thus drive under test) assigned to a group that performs the IDT and like tests may be coupled to each channel 410. A switch 802, running at interface (SATA, or example) speed, may carry out a multiplexing function to route commands, status information and data to and from a number of drives under test coupled to the switch 802. For example, four drives may be coupled to a single channel, resulting in an exemplary 1:4 relationship between the channel 410 and the drives under test, as shown at 806 in FIG. 8. Alternatively still, an even greater number of drives under test may be coupled to a single channel 410. For example, in the case wherein the slots 212 are assigned to a group of slots that is configured to carry out non-data intensive tests or procedures (e.g., that do not require much or any communication with the module controller host 304), a great many slots 212 may be coupled to a single channel 410, as shown at 808. In such cases, communications with the module controller 304 is often limited to the occasional transmission of control information and the monitoring of status information from the drive under test. For example, the seeded self-servo write test 204 and the burn-in self-test 208 have relatively low bandwidth requirements and the slots 212 assigned to groups carrying out such tests and procedures likely would be coupled to only a few channels 410, thereby creating a 1:n relationship between the channels 410 and the slots 212 and the drives under test loaded therein. It may be stated that the number of slots 212 to which each channel 410 is coupled increases as a required communication bandwidth between the module controller 304 and the slots 212 of the module controller's assigned group of slots decreases. Also, the number of slots 212 assigned to each group 410 may be proportional to the length of time necessary to complete the tests administered in each group.

Figure 9:
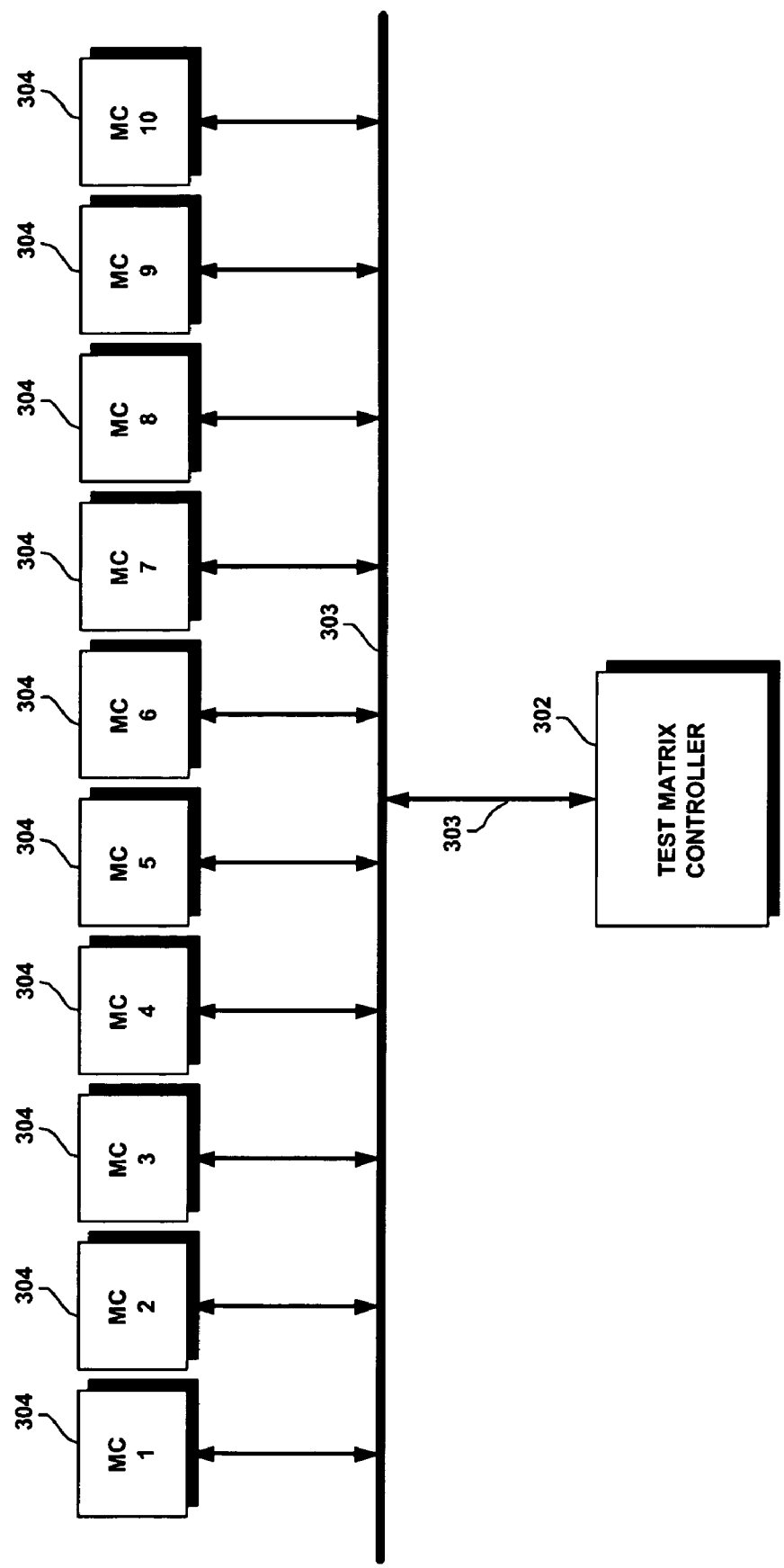
FIG. 9 shows the connection between the test matrix controller file server and a plurality of module controllers, according to an embodiment of the present invention.

FIG. 9 illustrates the scalability of the present invention, in which a plurality of module controllers 304 are coupled and controlled by the test matrix controller 302. In the illustrated embodiment, ten module controllers 304 are coupled to the test matrix controller 302, although a greater or lesser number of module controllers 304 may be connected thereto. Not shown in FIG. 9 is the automated loaded/unloader 306 or the test wall 200 of slots 212.

Figure 10:
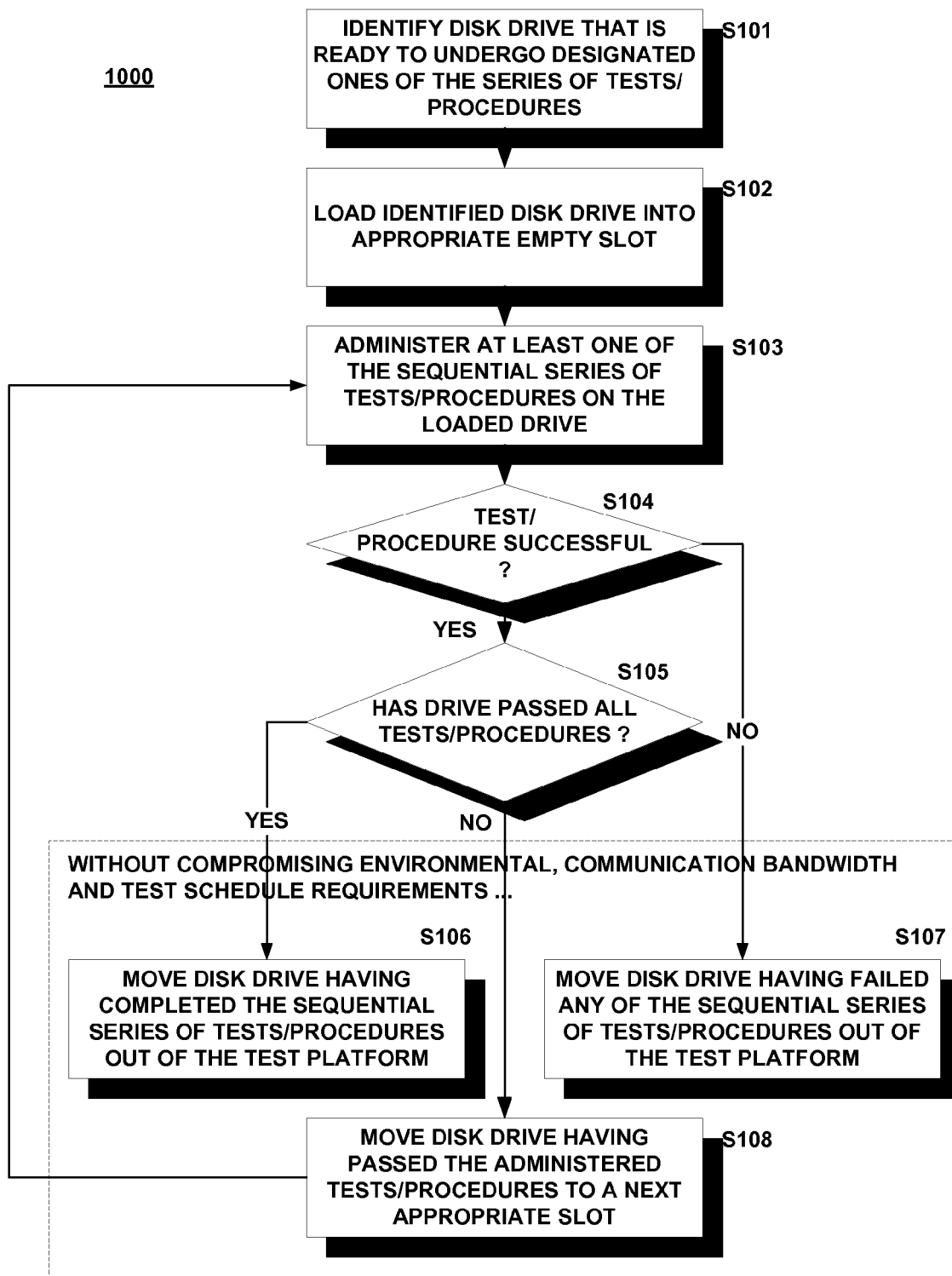
FIG. 10 is a flowchart illustrating aspects of the method of testing a plurality of disk drives in a test platform configured to administer a sequential series of tests on a plurality of disk drives, according to an embodiment of the present invention.

FIG. 10 is a flowchart illustrating aspects of the present method 1000 for testing a plurality of disk drives in a test platform that is configured to administer a sequential series of tests on the plurality of disk drives, according to an embodiment of the invention. As shown therein, step S101 calls for the identification of disk drives that are ready to undergo a test or procedure of the sequential series of tests. A drive that is ready to undergo a test or a procedure is one that has not yet undergone the first test or procedure of the sequential series, or one that has successfully completed one or more tests or procedures but that has not yet completed the entire sequence of tests or procedures. The drive that has been identified in steps S101 as being ready to undergo a test or a procedure is then loaded into an appropriate empty slot, as shown at S102. An appropriate slot is an empty slot (i.e., no drive is currently loaded therein) and that is assigned to a group that is configured to carry out a next test or procedure of the sequential series of tests or procedures. In step S103, one or more tests or procedures are carried out on the drive loaded into the slot 212, administered by a module controller 304. If the administered test or procedure is determined to have been unsuccessful as determined by communications between the drive under test and the module controller 304 coupled thereto (or lack of communication therewith), the test matrix controller 302 may command the automated loader/unloader 306 to asynchronously move the disk drive having failed the test or procedure out of the test platform 200, as outlined in step S107. This move is carried out without compromising the prevailing environmental, communication bandwidth and test schedule requirements of the other slots 212 of the test wall 200 or of the other drives under test. Also, this move may be carried out as soon as the automated loader/unloader is available to do so, without waiting for the other drives under test within the slot's group to finish the tests or procedures. In other words, the movement of drives in and out of the slots 212 of the test wall 200 need not be in batch mode, but may be adapted to be responsive to the contemporaneous requirements of the drives under test and the contemporaneous availability of slots.

If step S104 determines that the test or procedure was successfully completed, it may be determined, in step S105, whether the drive under test has completed all of the tests or procedures of the sequential series. If not, the loader/unloader 306 may be commanded to move the drive under test to a nest appropriate and available slot 212 in step S108. For example, the drive under test may have downloaded all of its microcode (reference 206 in FIG. 2B) and may be ready to be asynchronously moved to an available slot in the group 208 of slots configured to administer the burn-in self-test. The method may then revert to step S103. Again, the slots 212 and the loader/unloader 306 are configured so to enable this move to be effectuate without affecting environmental, communication and test schedule requirements of the other drives under test. If, in step S105, it is determined that the drive has indeed passed all of the prescribed tests and procedures of the sequential series of tests, the disk drive may then asynchronously be moved out of the test platform, as shown at S106.

It is to be noted that although the present invention is presented herein as communicating with the drive via the SATA and UDMA 100 protocols, the present invention is not limited thereto. Other communication protocols may be used including, for example, SCSI, Fibre Channel, FireWire (IEEE1394), USB or other existing or yet to be developed protocols. Preferably, the communications with the drives under test are carried out at interface speed, meaning the maximum data transfer rates specified by the protocol.

Advantageously, the present invention enables a more efficient usage of the slot real estate in the test wall 200. Also, drives of different capacities may be tested simultaneously, there being no requirement that all drives under test match, either in capacity or communication interface. For example, some of the drives may be SATA drives, while others may be parallel ATA (EIDE), for example. The asynchronous nature of the moving, loading and unloading of the drives into and out of slots that are self-contained with respect to environmental, bandwidth and test schedule requirements enables such a flexible use of the available slots 212, as compared with a synchronous batch process, in which drives are moved en masse, upon finishing any test or procedure.

According to another embodiment of the invention, a multi-drive adaptor for use in a slot of the previously-described disk drive test system may be utilized. More particularly, the multi-drive adaptor may include at least two ports for the receipt of at least two disk drives, respectively, such that a series of tests in a serial protocol may be performed on each of the disk drives within one slot of the disk drive test system.

As previously discussed with reference to FIG. 3, an asynchronous disk drive test system 300 having a plurality of slots 212 was disclosed in detail. In this embodiment, each slot 212 was configured to receive and to provide communication with a single disk drive under test. Further, as previously described in detail, module controllers 304 are assigned to slots 212. Each module controller 304 is configured to act as an I/O controller for the disk drive to which it is connected and to administer at least one of the sequential tests to the disk drive loaded in the slots 212. More particularly, in one example, the module controllers 304 communicate with the disk drives loaded in the slots 212, according to a serial protocol such as the SATA protocol. Further, as was previously described with reference to FIG. 4, SATA controller 304 utilizing a SATA host interface 408 may communicate a series of tests in a serial protocol to a particular slot 212 to be performed on a disk drive loaded in that slot.

In addition to the previously-described disk drive test system 300 that includes a serial controller 304 assigned to a slot 212 to communicate a series of tests in a serial protocol, embodiments of the invention further provide for utilizing a multi-drive adaptor having at least two ports for the receipt of at least two disk drives, respectively, such that a series of tests in a serial protocol may be performed on multiple disk drives within a single slot of the disk drive test system. However, it should be appreciated that these embodiments may be utilized within the asynchronous test system 300 previously described, a synchronous test system, or any sort of disk drive test system that utilizes a slot.

Figure 11:
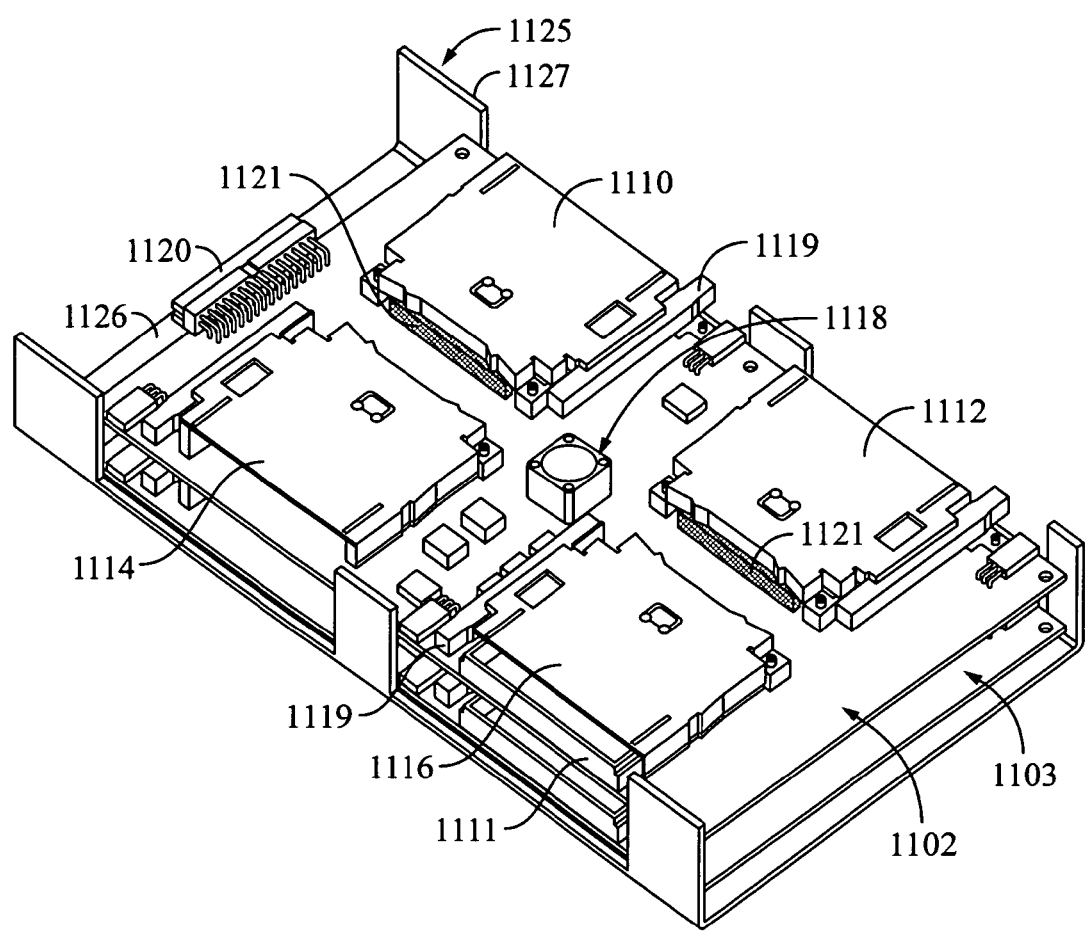
FIG. 11 is a perspective view of a multi-drive adaptor for use in a slot of a disk drive test system, according to an embodiment of the present invention.

With reference to FIG. 11, FIG. 11 is a perspective view of a multi-drive adaptor 1102 for use in a slot of a disk drive test system. Particularly, FIG. 11 illustrates two multi-drive adaptors 1102 and 1103 both respectively mounted to a housing 1125 having a base 1126 and upwardly projecting mounting tabs 1127. However, for ease of description, only multi-drive adaptor 1102 will be discussed, since multi-drive adaptor 1103 is substantially the same.

Particularly, multi-drive adaptor 1102 includes four rectangular-shaped ports 1110, 1112, 1114, and 116 for the receipt of respective disk drives (e.g. disk drive 1111). The multi-drive adaptor 1102 in housing 1125 may be mounted within a slot of a disk drive test system (as previously described) such that a series of tests in a serial protocol (e.g. SATA) may be performed on each of the multiple disk drives within a single slot of the disk drive test system.

As will be described hereinafter, the multi-drive 1102 adaptor provides a communication path to the ports 1110, 1112, 1114, and 1116 in which the communication path includes a connector 1120. The connector 1120 is configured to receive at least one disk drive command transmitted according to a serial protocol from the serial controller. The communication path is configured to communicate disk drive commands from the connector 1120 to disk drives loaded in the ports. These disk drive commands may be utilized to implement various types of testing upon the disk drives.

In one embodiment, the communication path may be implemented by a printed circuit board (PCB) 1118 that includes the connector 1120. However, it should be appreciated that the communication path may be implemented by a wide array of different types of circuitry and logic, the PCB embodiment to be hereinafter described, being only one. Various communication paths, as will be described, may be implemented using differing types of serial and parallel connectors, port multipliers, and bridges to implement the embodiments of the invention.

As can be seen in FIG. 11, each of the ports 1110, 1112, 1114, and 1116 are fixed to a printed circuit board 1118. Each port may include a guide arm 1119 to aid in the loading and unloading of a disk drive. Printed circuit board (PCB) 1118 also has a connector 1120 that couples to a connector of the slot, as will be discussed.

Connector 1120 may be a PATA connector, a SATA connector, a USB connector, or another suitable type of connector for the receipt and transmission of information to and from a disk drive through PCB 1118. Further, PCB 1118 includes suitable electronics for the receipt and transmission of information to and from disk drives that may be inserted into respective ports 1110, 1112, 1114, and 1116. Additionally, each of the respective ports 1110, 1112, 1114, and 1116 includes a suitable connector 1121 (e.g. CF+, PATA, SATA, USB, etc.) to connect the respectively mounted disk drive to the PCB 1118.

Particular electronic components of the PCB 1118 for the communication of tests in a serial protocol, and associated information, to and from the disk drives, respectively mounted in the ports, will be discussed in detail later. In essence, each disk drive mounted in its respective port 1110, 1112, 1114, and 1116 may receive and transmit information from and to the serial controller of the disk drive test system through PCB 1118 and connector 1120 such that a series of tests in a serial protocol may be performed on the plurality of disk drives, all of which take place in one slot.

Thus, a conventional slot of a disk drive test system that was originally designed to have enough space to accommodate a 3.5" disk drive can now be fully utilized in order to test a plurality of smaller form factor disk drives, such as 2.5" disk drives, 1.8" disk drives, 1" disk drives, 0.85" disk drives etc. In fact, as shown in FIG. 11, in this configuration two multi-drive adaptors 1102 and 1103 are illustrated showing that up to eight disk drives of 1" may be tested within one slot.

Figure 12:
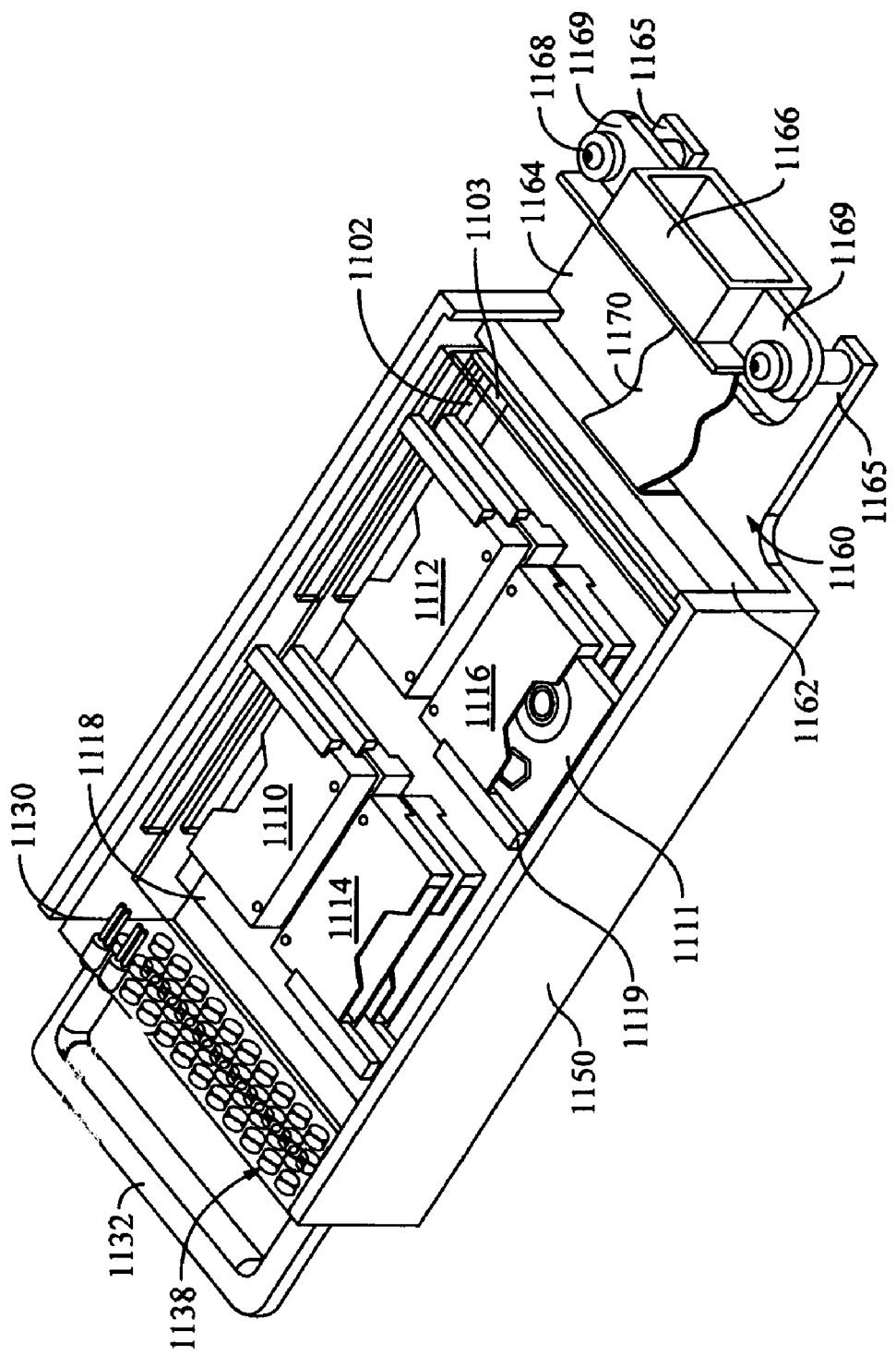
FIG. 12 is a perspective view of a carrier for a multi-drive adaptor that may be removeably coupled to a slot, according to an embodiment of the present invention.
Figure 13:
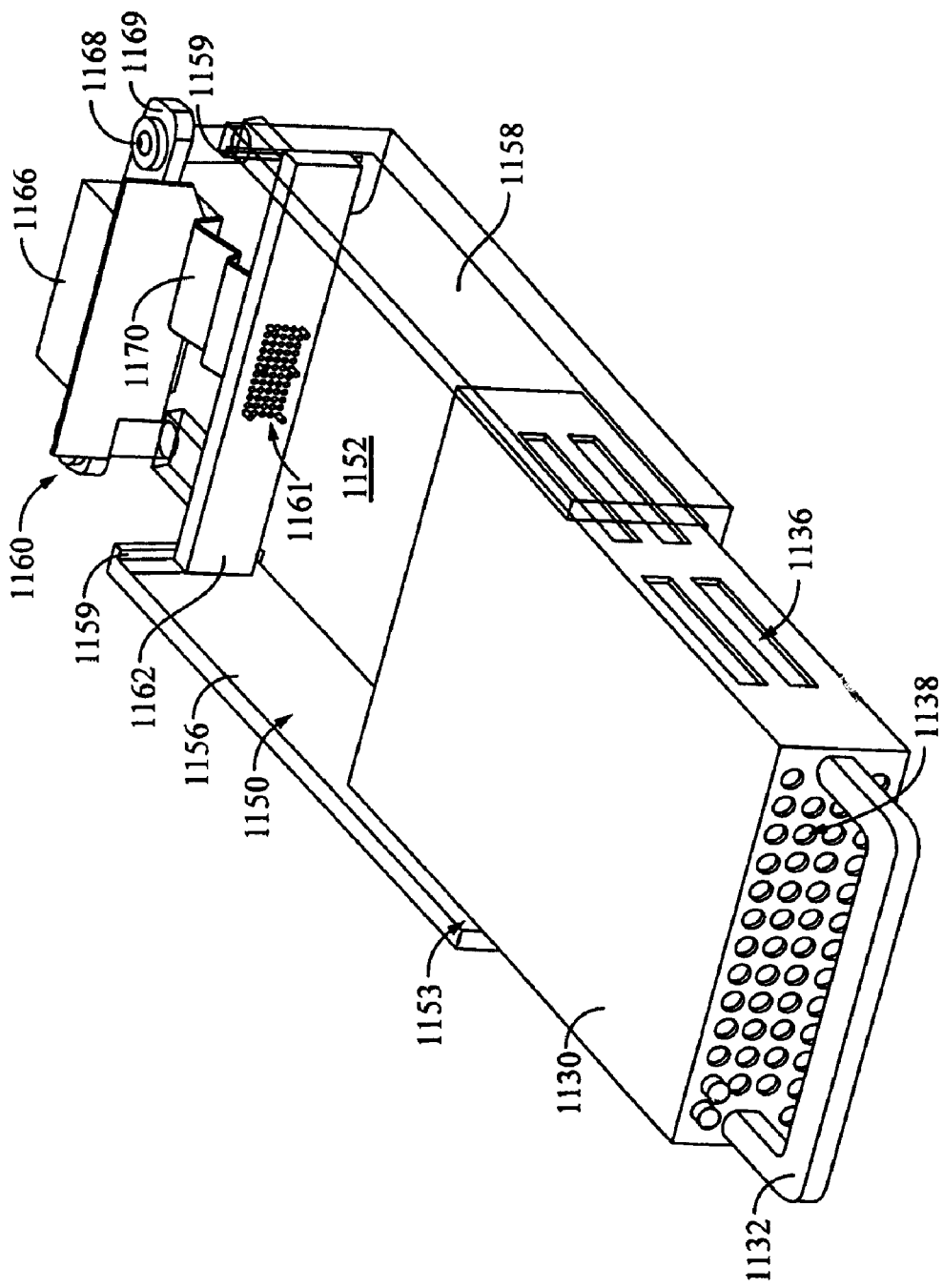
FIG. 13 is another perspective view of a carrier for a multi-drive adaptor that may be removeably coupled to a slot, according to an embodiment of the present invention.

With reference to FIGS. 12 and 13, FIGS. 12 and 13 show perspective views of a carrier for the multi-drive adaptors 1102 and 1103 that may be removeably coupled to a slot. In this configuration, an approximately rectangular-shaped carrier housing 1130 may be utilized. The multi-drive adaptors 1102 and 1103 mounted within housing 1125 are fixedly mounted in the carrier housing 1130. The carrier housing 1130 includes a handle 1132 such that carrier housing 1130 may be easily loaded and unloaded from a base carrier 1150 previously mounted into a slot. For example, the removable carrier housing 1130 may be manually loaded and unloaded by an operator or by a robotic loader, as previously discussed.

The removable carrier housing 1130 includes rectangular disk drive openings 1136 such that disk drives may be loaded and unloaded from the respective disk drive ports of the multi-drive adaptors 1102 and 1103. Also, air-ports 1138 may be present in the front face of the removable carrier housing to permit airflow.

A base carrier 1150 may be mounted into a slot for the loading and unloading of the carrier housing 1130. The base housing 1150 includes a base 1152, an open front face 1153 to allow loading and unloading of the carrier housing 1130, and sidewalls 1156 and 1158. Further, extending from sidewalls 1156 and 1158 are flanges 1159 to which a flex connection assembly 1160 may be mounted.

The flex connection assembly 1160 includes a back connector wall 1162 having a connector 1161 and a mounting portion 1164. It should be appreciated that connector 1161 is for mating with the connector 1120 of the multi-drive adaptor 1102 and/or 1103. As one example, connector 1161 may be serial or parallel type connectors in accordance with, for example, PATA, SATA, USB, etc., protocols.

The mounting portion 1164 allows for the connection of an external connector (not shown) housed in connector housing 1166 to an internal connector of the slot (not shown). Again, these connectors may be serial or parallel type connectors in accordance with, for example, PATA, SATA, USB, etc., protocols. The connectors 1161 and 1166 may be coupled to one another by a flex cable 1170.

Mounting portion 1164 is approximately U-shaped having a base portion and two legs 1165. Bolts 1168 may be mounted through connection ears 1169 of connector housing 1166 through the legs 1165 of the mounting portion 1164 and to the slot itself such that base carrier 1150 is mounted within a slot.

Thus, in this configuration the removable carrier 1130 housing multi-drive adaptors 1102 and 1103 may be removeably loaded and unloaded into and out of the slot.

In another embodiment, a carrier may be fixedly mounted into a slot and disk drives may be loaded and unloaded directly into the carrier fixed in the slot.

Figure 14:
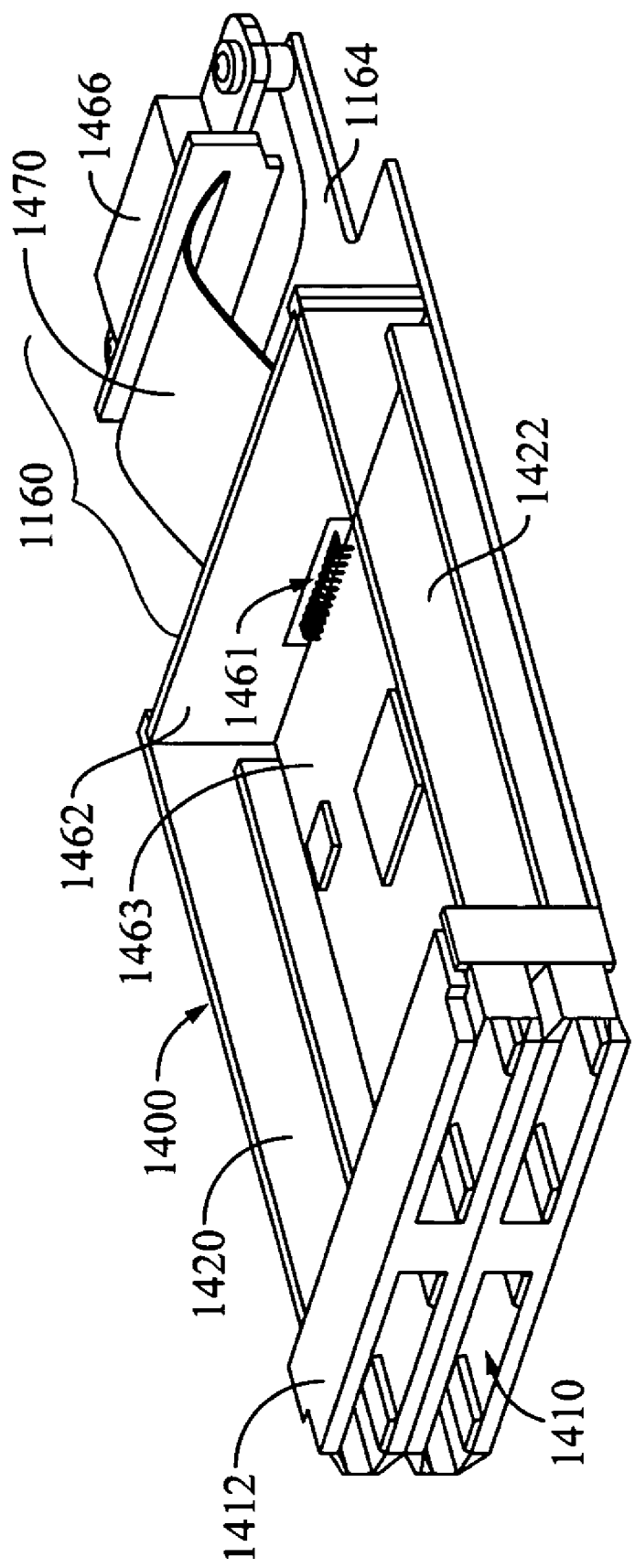
FIG. 14 shows a perspective view of a carrier that may be fixedly mounted in a slot, according to an embodiment of the present invention.

Turning now to FIG. 14, FIG. 14 illustrates a perspective view of a carrier that may be fixedly mounted in a slot. In this embodiment, the carrier 1400 includes a multi-drive adaptor already fixedly mounted therein, and the carrier 1400 is then fixedly mounted into a slot by utilizing a flex circuit cable assembly 1160, as previously discussed.

However, in this example, the connector 1461 of the PCB 1463 of the multi-drive adaptor (not completely shown) is directly coupled by flex cable 1470 to the connector of connector housing 1466 and the rear-wall 1462 is a bit larger. In other respects, the flex connection system 1160 is similar to that described with reference to FIGS. 12 and 13 and will not be repeated for brevity's sake. However, again it should be appreciated that connectors may be serial or parallel type connectors in accordance with, for example, PATA, SATA, USB, etc., protocols.

Further, it should be appreciated that the multi-drive adaptor including PCB 1463 is similar to the previously-described multi-drive adaptor 1102, however, in this instance, the ports are arranged in side-by-side and stacked fashion, near the front end of the fixed carrier housing 1400, such that disks may be loaded and unloaded through respective disk drive port openings 1410 of a front-face plate 1412 of the fixed carrier housing 1400.

It should be appreciated that the carrier housing 1400 may be of a simple housing design including a pair of opposed side walls 1420 and 1422 connected to front face plate 1412 and sandwiching rear-wall 1462.

The carrier housing 1400 includes a multi-drive adaptor fixed therein and the carrier housing itself is fixed within the slot such that the front-face place with respective openings 1410 is at the opening of the slot and the carrier housing 1400 is fixed in the slot by flex connection system 1466, such that disk drives may be easily loaded and unloaded either by a manual operator or by a robotic arm into and out of the respective ports of the multi-drive adaptor.

Turning now to FIGS. 15-17, different embodiments of multi-drive adaptors, communication paths, and in these embodiments, PCB electronics, will be discussed to allow for the utilization and testing of multiple parallel or serial disk drives in one slot of a disk drive test system.

With reference now to FIG. 15A, FIG. 15A is a block diagram illustrating one example of the use of a multi-drive adaptor 1500 for use in a slot 1501 of a disk drive test system in which a serial controller communicates with a plurality of disk drives in a serial protocol through a parallel connector. In one embodiment, the serial controller communicates a series of tests in a serial protocol at a transmission rate greater than 480 megabits (Mb) per second. In this example, the serial controller may be a SATA controller 1502 that is assigned to the particular slot 1501. For example, this serial controller may be a serial module controller of the disk drive test system previously discussed with reference to FIGS. 3 and 4. More particularly, in one embodiment, the serial controller may be a SATA controller such as a SILICON IMAGE SATA controller 31242-2 or 1.

In this example, SATA controller 1502 of slot 1501 may be connected through a PATA connector 1504 to seven SATA hard disk drives (HDDs) 1506 stored in ports of a multi-drive adaptor 1500. In this embodiment, three SATA HDDs 1506 are directly connected through the PCB and PATA connector 1504 to the SATA controller 1502. Further, in this embodiment, the PCB of the multi-drive adaptor, may include a port multiplier 1507 (e.g. a SILICON IMAGE 3726 port multiplier) coupled to another four SATA HDDs 1506. The port multiplier 1507 may be used to multiplex the SATA signal to the SATA HDDs 1506. As previously discussed each of the SATA HDDs are respectively loaded into a port of the multi-drive adaptor.

Accordingly, in this embodiment seven SATA HDDs 1506 are coupled through a PATA connector 1504 to the SATA controller 1502 of slot 1501 allowing for the communication of a series of tests to the seven HDDs within one slot of the disk drive test system.

It should be appreciated that a PATA connector typically has 40 pins whereas the SATA controller 1502 requires 8 pins for each transmit and receive pair (e.g. Tx$^+$, Tx$^-$, Gnd, Gnd, Rx$^+$, Rx$^-$, Gnd, Gnd). Therefore, up to five SATA control lines can be sourced through a 40 pin PATA connector.

Turning now to FIG. 15B, FIG. 15B is a block diagram illustrating a different configuration for a multi-drive adaptor 1503. In this example, the PCB of the multi-drive adaptor 1503 includes four SATA-to-PATA bridges 1510 coupled to the PATA connector 1507, and each respective SATA-to-PATA bridge 1510 is coupled to a respective PATA HDD 1512 loaded into a port of the multi-drive adaptor 1503. The SATA-to-PATA bridges 1510 convert the SATA signals to a PATA format. In this way, the serial SATA controller 1502 communicates with the PATA HDDs 1512 in a PATA protocol. However, the series of tests originating in a SATA serial protocol from SATA controller 1502 are still all performed on each of the multiple PATA HDDs 1512 within one slot of the disk drive test system, except in a PATA format. As an example of a SATA-to-PATA bridge, a MARVELL 88i030 IC may be utilized.

Figure 16A:
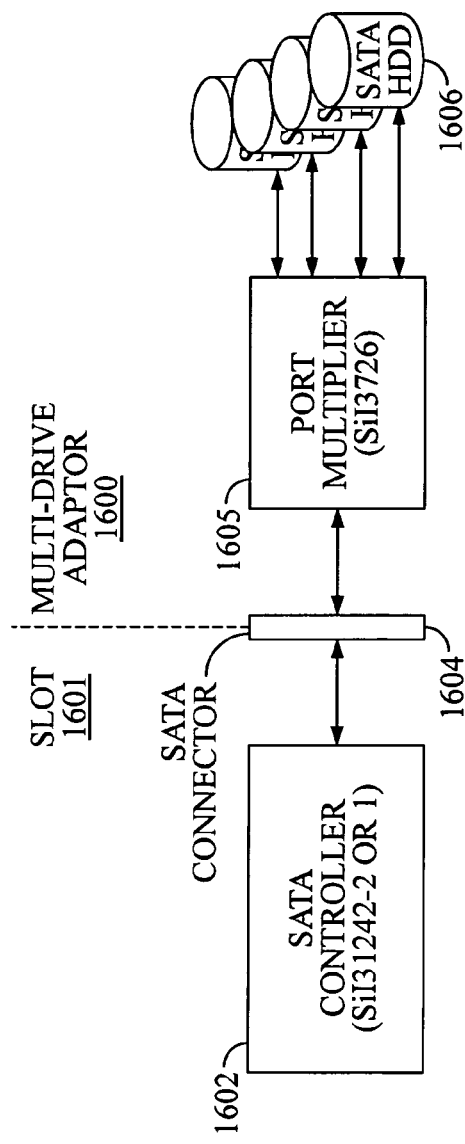
FIG. 16A is a block diagram illustrating another example of a multi-drive adaptor for use in a slot of a disk drive test system, according to an embodiment of the present invention.
Figure 16B:
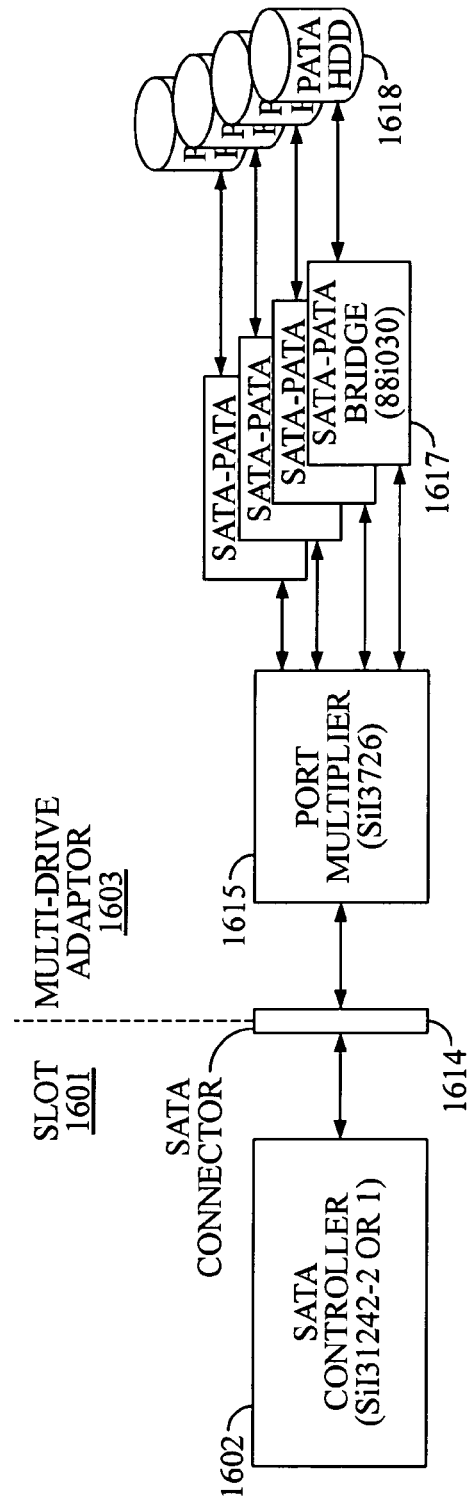
FIG. 16B is a block diagram illustrating another example of a multi-drive adaptor for use in a slot of a disk drive test system, according to an embodiment of the present invention.

With reference to FIG. 16A and FIG. 16B, block diagrams are shown illustrating different embodiments of a multi-drive adaptor in which the connector of the multi-drive adaptor may be a serial connector such that the serial controller communicates with the multiple disk drives in a serial protocol through the serial connector.

For example, a SATA controller 1602, as previously discussed may be utilized. However, as shown in FIGS. 16A and 16B, a serial SATA connector may be utilized to connect the SATA controller to the PCB of the multi-drive adaptor.

Particularly, in one example, as shown in FIG. 16A, the PCB of the multi-drive adaptor 1600 may include a port multiplier 1605 coupled to a SATA connector 1604 and to four SATA HDDs 1606 loaded into the ports of the multi-drive adaptor 1600. In this way, the SATA serial controller 1602 of slot 1601 communicates with the SATA HDDs 1606 in a SATA protocol such that a series of tests in a serial SATA protocol may be performed on each of the four SATA HDDs within one slot of the disk drive test system.

In another example, with reference to FIG. 16B, the PCB of the multi-drive adaptor 1603 may include a port multiplier 1615 and four SATA-to-PATA bridges 1617. In this example, the port multiplier 1615 is coupled to a SATA connector 1614 and to the four SATA-to-PATA bridges 1617, respectively, and the SATA-to-PATA bridges connect the four PATA HDDs 1618 loaded into ports of the multi-drive adaptor 1603 to the port multiplier 1615, respectively. In this configuration, the serial SATA controller 1602 of slot 1601 can transmit a series of tests in a serial SATA protocol that is then converted to a PATA format for use by the four PATA HDDs 1618 within one slot of the disk drive test system.

Figure 17A:
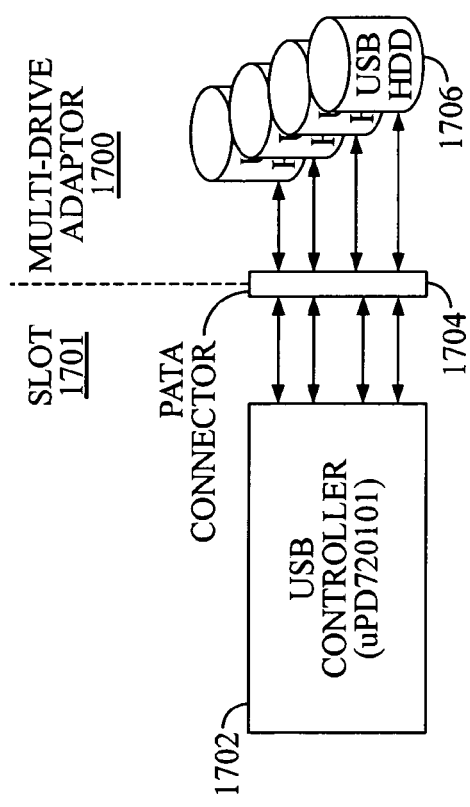
FIG. 17A is a block diagram illustrating another example of a multi-drive adaptor for use in a slot of a disk drive test system, according to an embodiment of the present invention.
Figure 17B:
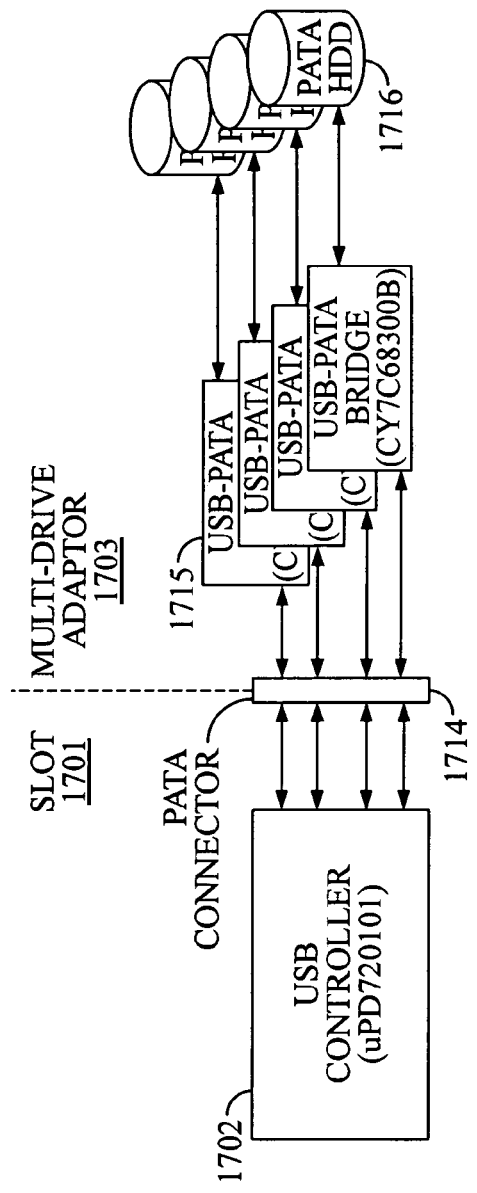
FIG. 17B is a block diagram illustrating another example of a multi-drive adaptor for use in a slot of a disk drive test system, according to an embodiment of the present invention.

With reference to FIGS. 17A and 17B, FIGS. 17A and 17B are block diagrams illustrating different embodiments of the invention in which the serial controller may be configured according to a universal serial bus (USB) protocol. Thus, in this example, instead of utilizing a SATA controller that is assigned to the slot in a disk drive test system, a USB controller may be utilized to transmit a series of tests in a serial protocol in accordance with a USB format which may then be performed on each of the disk drives within a slot of the disk drive test system. For example, a USB controller 1702 assigned to the slot 1701, such as a NEC uPD720101 type of USB controller, may be utilized.

In one embodiment, as shown in FIG. 17A, a PATA connector 1704 may be utilized to provide an interface to the USB serial controller 1702 such that the USB controller 1702 communicates with four USB HDDs 1706 loaded into the ports of the multi-drive adaptor 1700. In this way, a series of tests in a USB serial protocol may be performed on the USB HDDs 1706 in one slot of the disk drive test system.

In another example, as shown in FIG. 17B, the PCB of the multi-drive adaptor 1703 may include four USB-to-PATA bridges 1715 coupled to the PATA connector 1714 and to four PATA HDDs 1716 loaded into the ports of the multi-drive adaptor 1703. In one example, the USB-PATA bridges may be CYPRESS bridges (e.g. CY7C68300B). By utilizing this configuration of multi-drive adaptor 1703, a series of tests in a USB serial protocol may be transmitted to the multi-drive adaptor and converted to a PATA format by USB-PATA bridges 1715 for testing each of the four PATA HDDs within one slot of the disk drive test system.

As previously described, embodiments of the invention have been disclosed that relate to different types of multi-drive adaptors that provide structure and functionality by which a plurality of different types of standards-based disk drives (e.g. PATA, SATA, USB, etc.) may be tested within one slot of a disk drive test system. It should be appreciated that these communication paths and types of electronics are only exemplary.

Figure 18:
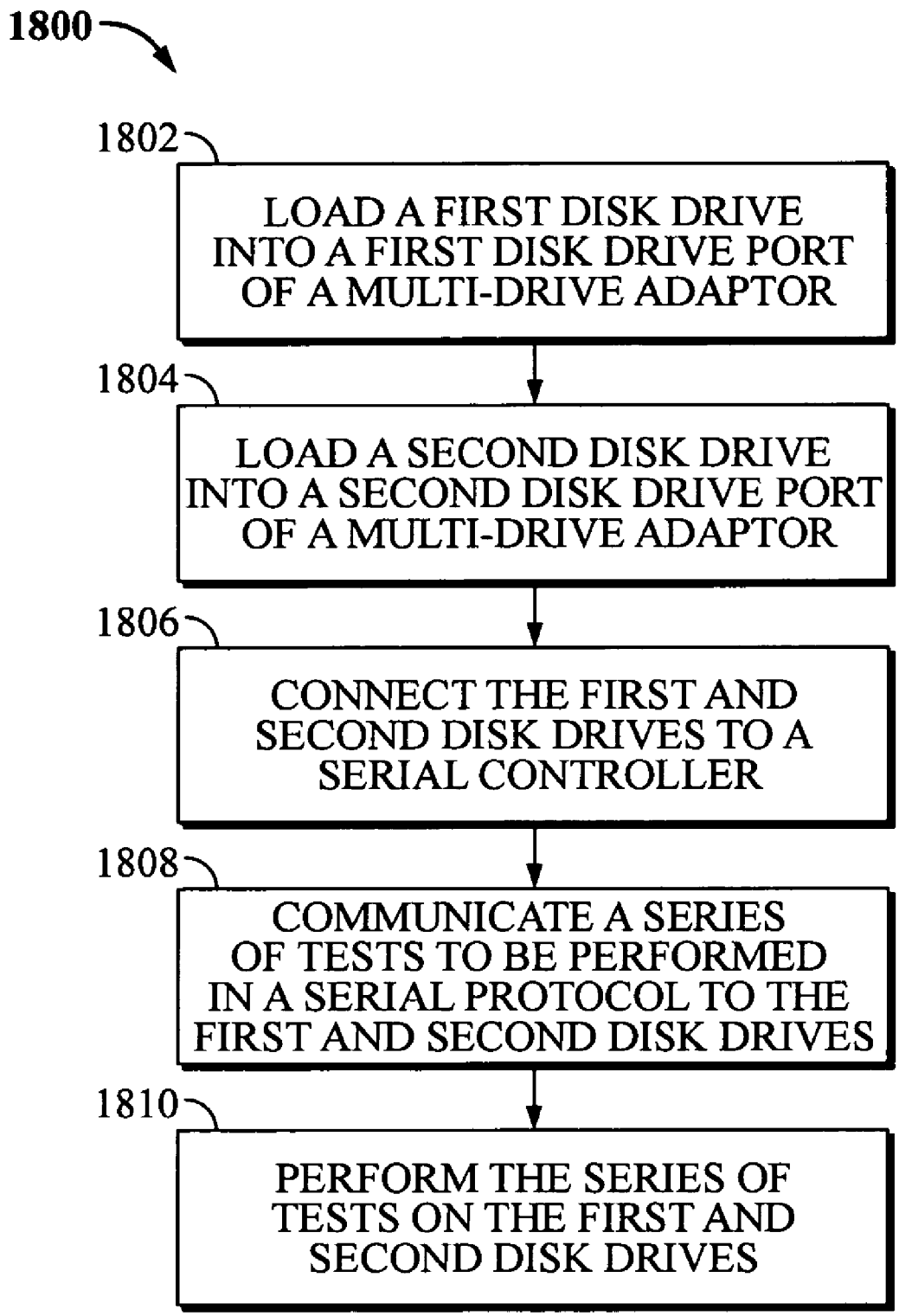
FIG. 18 is a flow diagram illustrating a test process for use with a multi-drive adaptor in a slot of a disk drive test system, according to an embodiment of the present invention.

Turning now to FIG. 18, FIG. 18 is a flow diagram illustrating a test process 1800 for use with a multi-drive adaptor in a slot of a disk drive test system.

At block 1802, a first disk drive is loaded into a first disk drive port of a multi-drive adaptor. At block 1804, a second disk drive is loaded into a second disk drive port of a multi-drive adaptor. The first and second disk drives are connected to a serial controller (block 1806). Then, at block 1808, a series of tests are communicated to the first and second disk drives loaded into the multi-drive adaptor to be performed on the disk drives in a serial protocol. These series of tests are then performed upon the first and second disk drives all within a single slot of the disk drive test system (block 1810).

Advantageously, embodiments of the invention enable a more efficient usage of slot space in a disk drive test system. Moreover, embodiments of the invention allow for the testing of different types of disk drives (example SATA, PATA, USB, etc.) with an already predetermined serial-type of controller assigned to the slot. Particularly, because there is an evolutionary change towards smaller disk drives having decreasing disk drive form factors (e.g. 2.5", 1.8", 1", etc.) embodiments of the invention ensure that valuable slot and disk drive test system space is utilized efficiently.

Although embodiments of the invention related to multi-drive adaptors have been described as being utilized with particular types of SATA and USB serial controllers, it should be appreciated by those of skill in the art that the previously-described multi-drive adaptors may be utilized with any type of serial controller.

We claim:

1. A multi-drive adaptor mountable in at least one slot of a test platform comprising:
at least two disk drive ports, wherein at least two small form factor disk drives are each mountable in each one of the at least two ports, respectively;
a connector configured to receive at least one disk drive test command transmitted according to a serial protocol from a serial controller assigned to the at least one slot of the test platform; and
a communication path to connect the at least two disk drive ports to the connector and configured to simultaneously communicate the at least one disk drive test command received at the connector to each of the at least two ports such that a same testing routine is simultaneously applied to the at least two small form factor disk drives.

2. The multi-drive adaptor of claim 1, wherein the communication path further comprises a printed circuit board (PCB).

3. The multi-drive adaptor of claim 1, wherein:
the connector comprises a serial connector; and
the communication path comprises a port multiplier coupled to the serial connector and the at least two ports, the port multiplier configured to replicate the at least one disk drive test command to each of the at least two ports.

4. The multi-drive adaptor of claim 3, wherein the communication path further comprises a plurality of serial-to-parallel bridges, each serial-to-parallel bridge coupled to the port multiplier and further coupled to a respective one of the at least two ports.

5. The multi-drive adaptor of claim 4, wherein the at least one disk drive test command is transmitted in accordance with a Serial Advanced Technology Attachment (SATA) standard, the serial controller is a SATA controller, and the serial-to-parallel bridges are SATA-to-PATA (Parallel Advanced Technology Attachment) bridges such that the SATA controller communicates to a respective one of the at least two ports in a PATA protocol.

6. The multi-drive adaptor of claim 1, wherein:
the connector comprises a parallel connector; and
the communication path comprises a plurality of serial-to-parallel bridges, each serial-to-parallel bridge coupled to the parallel connector and further coupled to a respective one of the at least two ports.

7. The multi-drive adaptor of claim 6, wherein the serial controller is a Serial Advanced Technology Attachment (SATA) controller.

8. The multi-drive adaptor of claim 7, wherein the serial-to-parallel bridges are SATA-to-PATA (Parallel Advanced Technology Attachment) bridges such that the SATA controller communicates to a respective one of the at least two ports in a PATA protocol.

9. The multi-drive adaptor of claim 1, wherein the connector is a Parallel Advanced Technology Attachment (PATA) connector.

10. The multi-drive adaptor of claim 1, wherein:
the connector comprises a parallel connector; and
the communication path comprises a port multiplier.

11. The multi-drive adaptor of claim 10, wherein the connector is a Parallel Advanced Technology Attachment (PATA) connector.

12. The multi-drive adaptor of claim 11, wherein the serial controller is configured according to a Serial Advanced Technology Attachment (SATA) protocol.

13. The multi-drive adaptor of claim 1, wherein:
the serial controller is configured according to a universal serial bus (USB) protocol; and
the connector comprises a parallel connector.

14. The multi-drive adaptor of claim 13, wherein the connector is a Parallel Advanced Technology Attachment (PATA) connector.

15. The multi-drive adaptor of claim 14, wherein the communication path comprises at least two USB-to-PATA bridges coupled to the PATA connector, each USB-to-PATA bridge coupled to the PATA connector and further coupled to a respective one of the at least two ports.

16. A disk drive test system for testing a plurality of small form factor disk drives comprising:
a test platform having a plurality of slots;
a multi-drive adaptor mountable in at least one slot of the plurality of slots, a serial controller assigned to the slot to communicate a series of tests in a serial protocol, the multi-drive adaptor comprising:
at least two disk drive ports such that at least two small form factor disk drives are each mountable in each one of the at least two ports, respectively; and a printed circuit board (PCB) including a connector, the at least two ports being fixed to the PCB and the connector to couple the at least two small form factor disk drives to the serial controller such that when the serial controller communicates at least one disk drive test command a same testing routine is simultaneously performed on each of the at least two small form factor disk drives.

17. The disk drive test system of claim 16, wherein the connector is a Parallel Advanced Technology Attachment (PATA) connector such that the serial controller communicates with the at least two small form factor disk drives in a Serial Advanced Technology Attachment (SATA) protocol through the PATA connector.

18. The disk drive test system of claim 17, wherein the PCB further comprises a port multiplier that is coupled to the PATA connector, the port multiplier connected to at least a third small form factor disk drive, such that the serial controller communicates with at least three small form factor disk drives in a SATA protocol.

19. The disk drive test system of claim 17, wherein the PCB further comprises at least two SATA-to-PATA bridges coupled to the PATA connector and the at least two small form factor disk drives, respectively, such that the serial controller communicates with the at least two small form factor disk drives in a PATA protocol.

20. The disk drive test system of claim 16, wherein the connector is a serial connector in accordance with a Serial Advanced Technology Attachment (SATA) standard.

21. The disk drive test system of claim 20, wherein the PCB further comprises a port multiplier coupled to the serial connector and to the at least two small form factor disk drives, such that the serial controller communicates with the at least two small form factor disk drives in a SATA protocol.

22. The disk drive test system of claim 20, wherein the PCB further comprises a port multiplier and at least two SATA-to-PATA (Parallel Advanced Technology Attachment) bridges, the port multiplier coupled to the serial connector and the at least two SATA-to-PATA bridges, respectively, the at least two SATA-to-PATA bridges connecting the port multiplier and the at least two small form factor disk drives, respectively, such that the serial controller communicates with the at least two small form factor disk drives in a PATA protocol.

* * * * *